United States Patent [19]

Uchiyama et al.

[11] 4,078,242
[45] Mar. 7, 1978

[54] FLASH LIGHT PHOTOGRAPHIC SYSTEMS

[75] Inventors: Takashi Uchiyama, Yokohama; Zenzo Nakamura, Urawa; Tokuichi Tsunekawa; Masanori Uchidoi, both of Yokohama; Yukio Mashimo, Tokyo; Shyohei Ohtaki, Machida, all of Japan

[73] Assignee: Canon Kabushiki Kaisha, Tokyo, Japan

[21] Appl. No.: 625,711

[22] Filed: Oct. 24, 1975

[30] Foreign Application Priority Data

Oct. 29, 1974 Japan .............................. 49-124612
Oct. 30, 1974 Japan .............................. 49-125110

[51] Int. Cl.² .................................... G03B 15/03
[52] U.S. Cl. .................................. 354/139; 354/33; 354/35; 354/60 F; 354/145; 354/149
[58] Field of Search ................. 354/33, 35, 60 F, 139, 354/145, 149

[56] References Cited

U.S. PATENT DOCUMENTS

| 3,688,664 | 9/1972 | Mashimo | 354/33 |
| 3,710,701 | 1/1973 | Takishima et al. | 354/149 |
| 3,742,828 | 7/1973 | Nakajima et al. | 354/33 |
| 3,757,654 | 9/1973 | Mori | 354/33 |
| 3,836,920 | 9/1974 | Uchiyama et al. | 354/149 |
| 3,886,568 | 5/1975 | Yazaki et al. | 354/139 |
| 3,995,286 | 11/1970 | Tokutomi | 354/33 |

Primary Examiner—Russell E. Adams
Attorney, Agent, or Firm—Toren, McGeady and Stanger

[57] ABSTRACT

The present invention relates to various kinds of the flash light photographic systems consisting of a combination of either of the below mentioned cameras with either of the below mentioned flash light device;

a camera CD presenting an input terminal of the information for controlling the diaphragm and the output terminal of the information for the set aperture, a flash light device SD presenting the output terminal of the information for controlling the diaphragm and the input terminal of the information of the set aperture, a camera CT presenting an input terminal of the information for controlling the diaphragm, a camera CA presenting an output terminal of the information of the set aperture, a flash light device ST presenting an output terminal of the information for controlling the diaphragm, a flash light device AS presenting an input terminal of the information of the set aperture.

6 Claims, 21 Drawing Figures

LIGHT MEASUREMENT CIRCUIT
ALARM CIRCUIT
DIAPHRAGM ADJUSTMENT CIRCUIT
SHUTTER MECHANISM CONTROL CIRCUIT

TIMING CIRCUIT

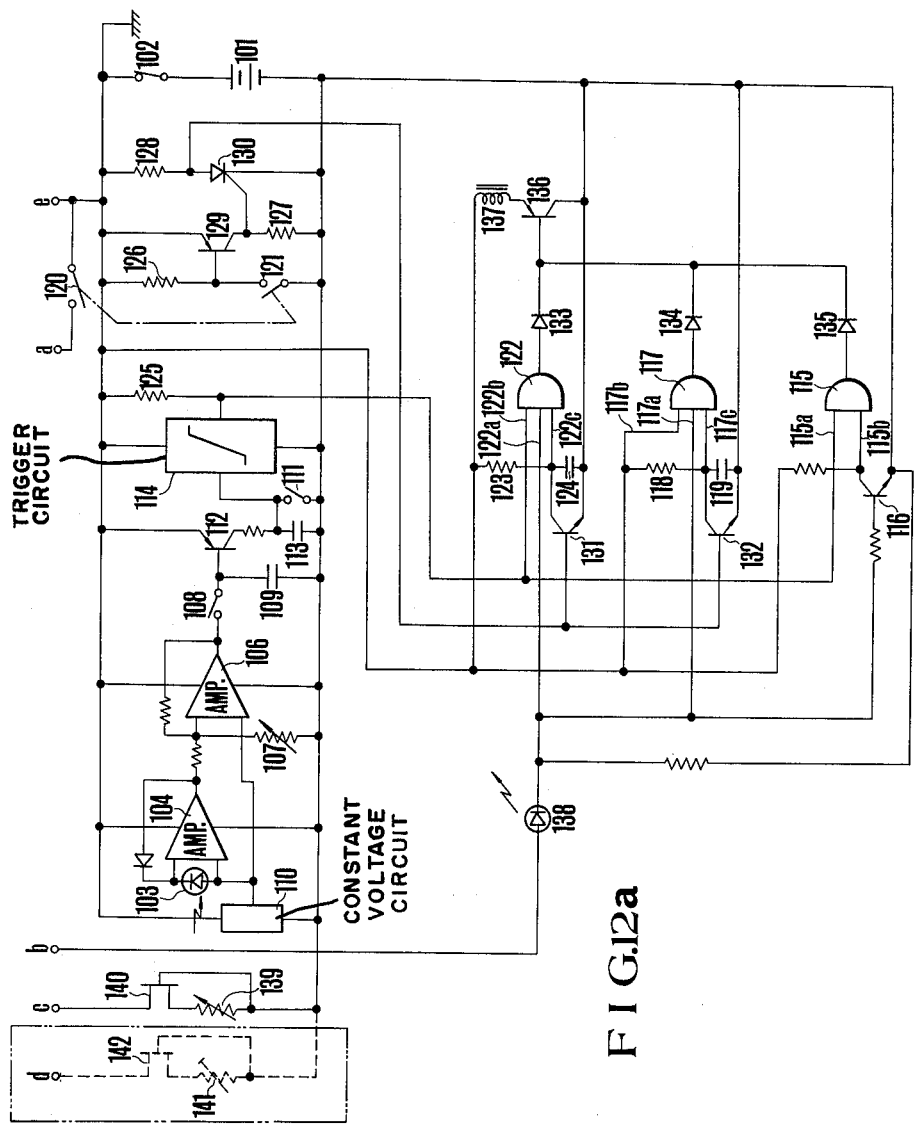
F I G. 12a

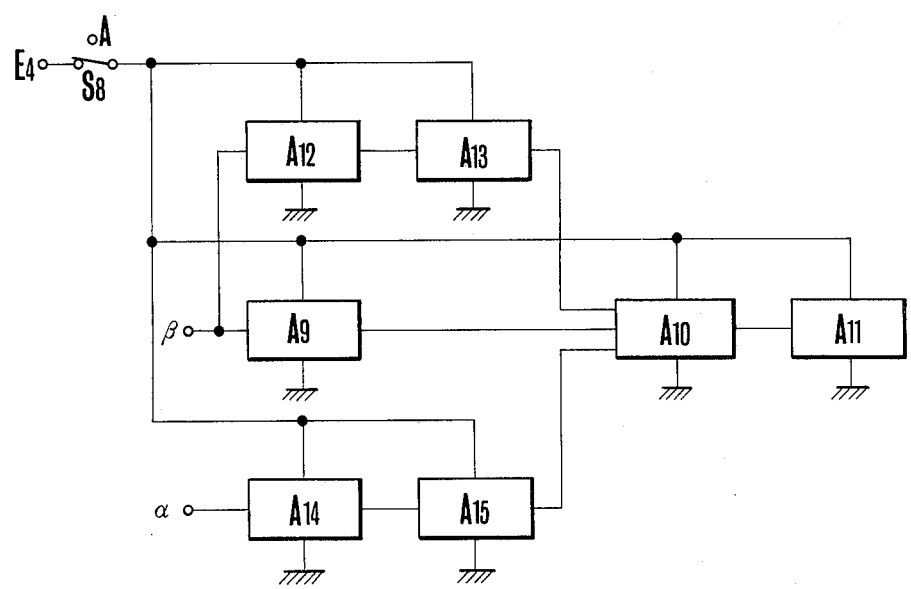
F I G. 16

FLASH LIGHT PHOTOGRAPHIC SYSTEMS

BACKGROUND OF THE INVENTION

1. Field of the Invention

The present invention relates to a flash units and cameras for taking flash photograph.

2. Description of the Prior Art

In one known flash system, a flash unit generates a signal, corresponding to a desired aperture value, at a data output terminal. A camera, which receives the signal at a data input terminal, displays the signal in the camera view finder or utilizes the signal to adjust the aperture. In a second known system, a camera responds to a preset aperture value and a desired flash brightness signal at a data output terminal. A flash unit receives the signal at a data input terminal and sets the flash brightness to a proper value.

SUMMARY OF THE INVENTION

An object of the present invention is to render either of such cameras capable of performing the functions of both by adding only a few parts, in a convenient and economic manner.

Another purpose of the present invention is to make either flash units capable of performing the operation of both by adding only a few part to the first or the second flash unit.

Another purpose of the present invention is to permit automatic change switching of the operating mode of the flash unit to that of the camera, a reduction of the number of data input and output terminals, an indication in the view finder as to whether the flash light device is ready for operation, prevention of misoperation, switching of the shutter time into that for the flash light photography, ect.

BRIEF DESCRIPTION OF THE DRAWINGS:

FIG. 12(a) shows a circuit diagram of an embodiment of the camera with priority on aperture value shown in FIG. 4.

FIGS. 13 to 16 respectively show a circuit diagram of an embodiment of the first, the second, the third and the fourth circuit part of the camera in accordance with the present invention shown in FIG. 5.

DESCRIPTION OF PREFERRED EMBODIMENT

Below the present invention is explained in detail in accordance with the accompanying drawings.

Figure 1:
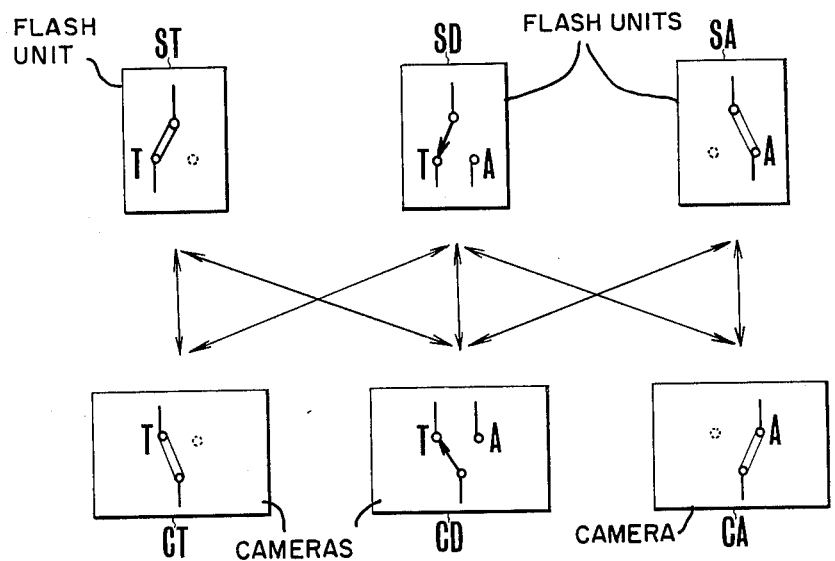
FIG. 1 shows the relations between the camera in accordance with the present invention and the flash light device.

FIG. 1 shows flash units and cameras for various kinds of flash photography. A flash unit ST and a camera CT form the above mentioned first known flash system. A flash unit SA and a camera CA form the above mentioned second known flash system. A flash unit SD in accordance with the present invention, possesses information or data input and output terminals. The flash unit SD performs the functions of the afore mentioned ST and units SA on the basis of the condition to which it is switched manually or automatically. In consequence the flash unit SD is capable not only of performing the functions of system with the above mentioned camera CT but that of the second flash system with the above mentioned camera CA. Further the flash unit SD is capable of operating not only in the mode of the first flash system but also the second mode with a camera CD of the present invention in accordance with the set conditions. The camera CD operates in the mode of the above mentioned camera CT as well as that of the camera CA depending on the condition to which it is switched by manual or automatic facilities. In consequence, the camera CD is capable of operating in the mode of the first flash system with the above mentioned flash unit ST or of the second flash system with the above mentioned flash unit SA. Further, the camera CD is capable of operating in both the first flash mode and the second flash mode with the above mentioned flash unit SD.

Figure 2:
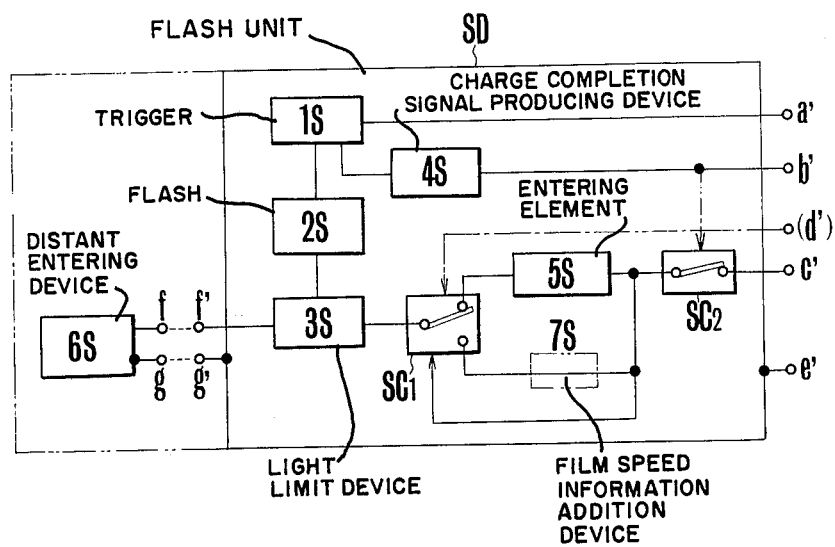
FIG. 2 shows a circuit block diagram of an embodiment of the flash light device in accordance with the present invention.

FIG. 2 shows a block diagram of the flash unit. In the drawing, SD terminal $a'$, $b'$, $c'$, $d'$, and $e'$, are respectively connected to the corresponding terminals $a$, $b$, $c$, $d$ and $e$ of the cameras CT, CA, CD explained later in detail, by means of the cords or the terminals provided on an accessary shoe. Where a part of the components to be provided in the flash unit is provided in a separate enclosure as is shown in the drawing, the terminals $f'$ and $g'$ of the separate enclosure are connected to the terminals $f$ and $g$ of the flash unit by means of cords or terminals provided on the mount. A switching device $SC_1$ switches by means of which the operation of the flash unit either to the first flash mode or the second flash mode by manually operating the switching member provided at the flash unit or automatically by a signal from the connected camera.

A trigger device is for a flash discharge tube is connected to the, synchronization switch through the terminal $a'$, $a$. Closing the synchronization switch produces a trigger signal to actuate a flash device 2S. A charge completion signal producing device 4S connected to the main capaciter delivers a signal to the camera through the terminal $b'$. The signal is synchronized for example, with the illumination of a neon tube so as to set the above mentioned trigger device 7S ready for operation. An aperture value information producing device 5S produces an absolute aperture value signal corresponding to the set aperture value of the photographic lens. The signal is by conditions such as the characteristics of the flash unit, the changed over state etc. Terminals C' and C, as well as switching device $SC_2$ deliver the aperture value signal to an operation device in the camera. If the film sensitivity is not entered into the camera's aperture determining device, which is in functional engagement with the operation device while taking a flash photograph, the film sensitivity is set in an entering element 5S. A distance information entering device 6S is composed either integral with the flash unit SD or formed as a separate body as shown in the drawing. The device 6S includes a light sensing element for receiving the light reflected by the object to be photographed. As soon as the integrated value reaches a certain determined value, a limit device 3S is actuated to stop the illumination of the flash unit 2S. Device 6S is a distance information producing device composed of a variable resistance in functional engagement with the focusing operation of the photographic lens for controlling the illumination of the flash unit. Aperture value information producing device 5S supplies information to a light quantity limit device 3S in accordance with the mode of the switching device $SC_1$ or the aperture value information from the camera so as to control the amount of light of the unit device 2S. Switching device $SC_2$ may be activated by the charge completion signal producing device 4S such that the aperture value data is delivered to the camera only after the charge is completed. In the drawing, members e' and g' are the terminals for a common line between the flash unit SD and the camera and distance entering device 6S. The discrimination signal from the camera enters terminal d'. The switching device $SC_1$ is automatically set to the desired mode depending upon whether the first or second camera is connected. Terminal d' may be eliminated by substituting the above mentioned terminal c' so that switching device $SC_1$ is automatically set to the desired mode by means of the discrimination signal which serves as an aperture value data signal coming through the terminal c'. When the second camera is used, device $SC_1$ is set to the mode opposite to that shown in the drawing by means of a manual switching operation or by the discrimination signal coming through terminal d', or through terminal c' serving as d' in the aforementioned case. The aperture value information from the second camera is entered in the light limit device 3S through the terminal c'. The information then passes through the switching device $SC_2$ which is cosed at the charge completion and through the switching device $SC_1$ so that the output of flash unit 2S is controlled by means of the input from the distance information entering device 6S. If the aperture value date from the camera does not include the film speed information it is necessary to provide the film speed information addition device 7S shown in the drawing. The explanation has been made for the case where the flash unit SD is separated from 6S. It is also possible to include components other than 6S in the same enclosure with 6S. The circuit diagrams for the afore mentioned flash units ST and SA are identical with that of flash unit SD in FIG. 2 with the exception that switching device $SC_1$ is fixed at the position, opposite to that in the drawings, eliminating 7S or 5S.

Figure 3:
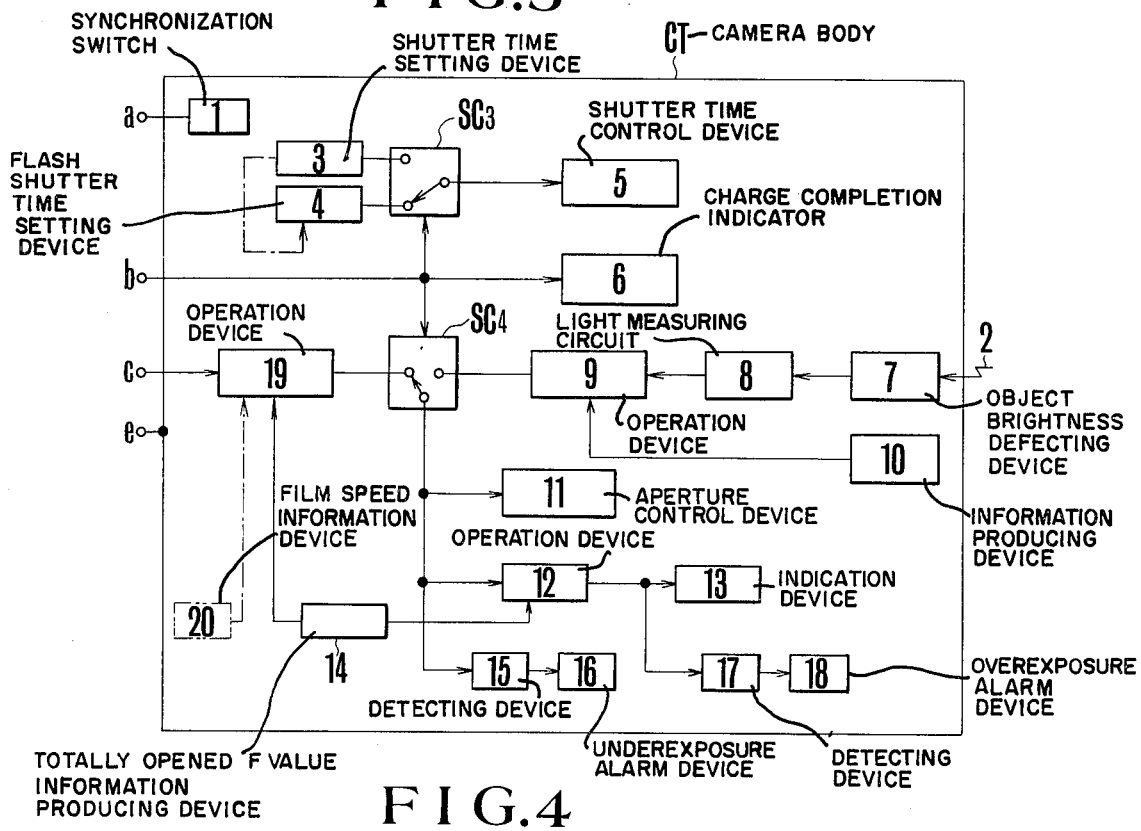
FIG. 3 shows a circuit diagram of an embodiment of the camera with priority on shutter time, being used in functional engagement with the corresponding flash light device.

FIG. 3 is an embodiment of the first camera. The latter indicates or controls the aperture value in response to the aperture value signal coming through the above mentioned flash unit SD or ST. In the camera body or housing is CT the synchronization switch 1 is synchronized with the shutter operation. The switch 1 can either be a conventional mechanical contact member or an electrical switch composed of a semiconductor switching element. The shutter time setting device 3 is composed of a variable resistance in functional engagement with the shutter dial. The flash shutter time setting device 4 operates the shutter for flash photography with speeds such as 1/60 sec. Device 4 may also set the flash light shutter time in connection with the afore mentioned device 3 as shown in dotted lines. Thus, when device 3 is set to a value suitable for flash photography, the shutter time control device 5 operates as it is set. If the value of device 3 is not suitably set, the control device 5 operates at shutter speeds such as 1/60 sec. The shutter time control device 5 controls the shutter time with the set value of device 3 or 4 device in accordance to the mode of the switching device $SC_3$. A completion indicator 6 of the flash unit operates only when the flash unit is ready for operation. Object brightness detecting device 7 composed of a photoelectrical converting element for TTL totally opened light measurement, senses the light 2 coming from an object to be photographed so as to produce the brightness information influenced by the totally opened aperture value F of the lens. The light measuring circuit 8 possesses a compressing logarithmic characteristic for producing a compressed output of the above mentioned information The operation device 9 receives information from device 8. The information producing device 10 which is set in functional engagement with the shutter dial, the film sensitivity dial, the totally opened F value signal member, etc. also conveys information to device 9. Information concerning vignetting which occurs during the totally opened light measurement by a bright lens is set in device 10 as aperture information. The data is received by device 9 which consequently produces a diaphragm step number signal, namely a signal corresponding to the number of steps for closing the diaphragm of the photographic lens from the totally opened F value to obtain the proper exposure. Aperture control device 11 controls the aperture of the photographic lens in accordance with the diaphragm step number signal produced by means of switching device $SC_4$. Operation device 12 and indication device form an indication circuit for indicating the absolute aperture value information obtained from the signal from the totally opened F value information producing device 14. The latter is set by the totally opened F value information member of the photographic lens and the above mentioned diaphragm step number signal of device 9. The detecting device 15 and the under exposure alarm device 16 form the under exposure alarm circuit. When the diaphragm step number signal entered into device 15 is insufficient, device 16 operates an alarm indicating under exposure even with a totally opened F value. The detecting device 17 and the over exposure alarm device 18 form the over exposure alarm circuit. When the absolute aperture value signal entered into device 17 is excessive device 18 operates so as to produce an over exposure alarm even with the smallest aperture value of the lens. Operation device 19 utilizes the absolute aperture value entered from the flash unit through the terminals c' and c and the totally opened F value from device 14 so as to produce the diaphragm step number signal. When switching device $SC_4$ is set to the device 19, all of devices 11 to 18 operate in accordance with the output signal from device 19. Consequently the various afore mentioned devices of camera CT operate in accordance with data from the flash unit SD or ST. Film speed information device 20 must be provided if no film speed information is included in the signal sent from the flash unit to device 19.

The operation of camera CT of FIG. 3 in connection with either of the aforementioned flash unit SD or ST is explained below.

If the flash unit is mounted on the camera CT or if the flash unit is mounted but the charge has not yet been completed such as occurs for daylight exposure, the no charge completion signal is received by the camera CT from the flash unit consequently the switching devices $SC_3$ and $SC_4$ are set to the terminals opposite to those shown in the drawing. When the release is operated after the shutter time is set by means of device 3, the shutter is operated with the desired time by means of device 3 and 5. The diaphragm control device 11 operates in accordance with the aperture value signal from 7 to 10, so as to control the diaphragm of the lens to the aperture value suited for proper exposure of the film.

The indication device 13 indicates the afore mentioned aperture value so that when the aperture value is outside of the settable of the diaphragm range of the photographic lens, either the under exposure alarm device 16 or the over exposure alarm device 18 operates. In this way, the photographer is able to change the setting of the shutter time so as to take a photograph within a settable range of the diaphragm.

When the charge has not yet been completed even if the flash unit is mounted, device 4S brings device LS out of operation so that there is no danger that the flash unit will operate.

When the flash unit is mounted on the camera CT and ready for operation, the charge completion indicator device 6 provided in the viewfinder responds to the signal from the charge completion signal producing device 4S. The device 6 then informs the photographer that the flash unit is ready for operation. Further switching devices $SC_3$ and $SC_4$ are set as shown in the drawing, while the shutter time is set by means of the flash light shutter time setting device 4 for example at 1/60 sec. Device 4 is connected with the shutter time control device 5 through switching $SC_3$ such that the shutter operates with the time suited for the flash photography. On the other hand, the diaphragm control device 11, the aperture value indicating device 13 and the alarm devices 16, and 18 all operate in accordance with the output signal of the aperture information producing device 5S in the flash light device so as to carry out the diaphragm control suited for flash light photography, as well as indication and alarming thereof.

The synchronization switch 1 operates in synchronism with the shutter release. The shutter time of course suited for flash light photography. The flash unit is now by the switch 1 and amount of light of the flash is controlled in accordance with the distance from the object, etc. while the diaphragm is set at a certain determined value as mentioned above. This produces a proper flash exposure.

When the flash unit operates, the charge completion signal from 4S discontinues. Thus, regardless of the amount of light the avore-mentioned indication device 6 remains out of operation for more than the predetermined time and indicates in the view finder that the flash unit has operated. If the aforementioned flash unit is used with the camera CT shown in FIG. 3, operations such as the indication of the charge completion and the operation of the flash unit in the finder, automatic switching of the circuit, movement of the diaphragm, as well as automatic switching of the shutter time are carried out in a manner similar to that, and as conveniently as ordinary EE photography.

Figure 4:
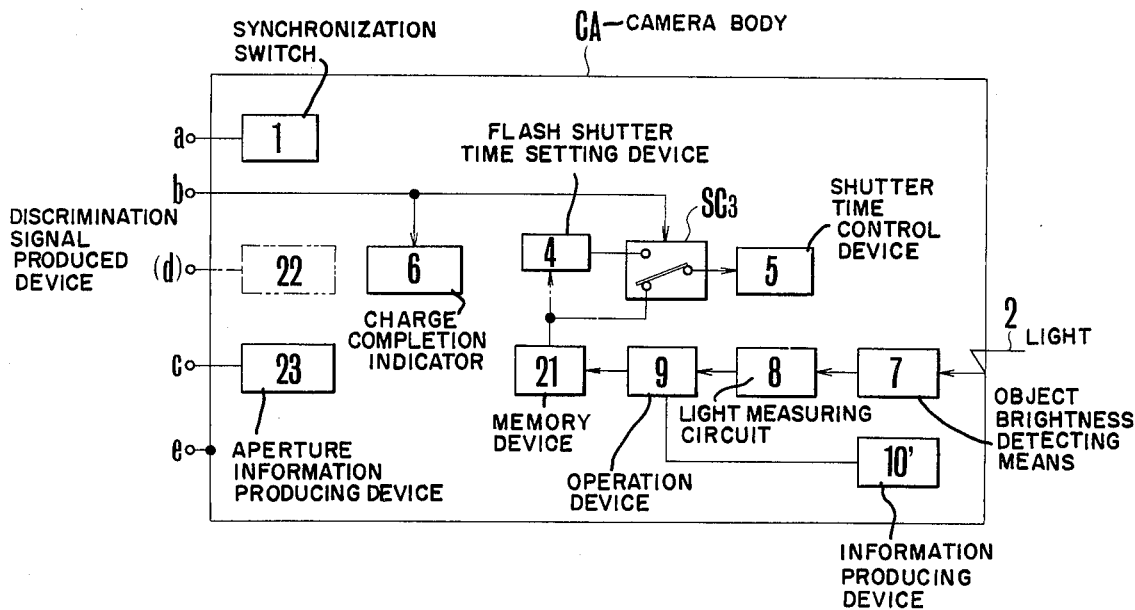
FIG. 4 shows a circuit diagram of an embodiment of the camera with priority on aperture value, being used in functional engagement with the corresponding flash light device.

An embodiment of the second camera which delivers an aperture signal to the afore mentioned flash unit SA or SD, so as to control the amount of light of the flash unit in accordance with the set aperture value of the camera follows. The numerical figures in the second camera represent the same devices as those in the above mentioned camera CT. Namely, devices 1, 2 and 4 to 9 in FIG. 4 are same as those in FIG. 3. An information producing device 10′ produces aggregate data concerning the film speed, the compensation of vignetting, the preset diaphragm step number and so on while the afore mentioned device 10 produces the total information of the film sensitivity, shutter time, compensation of vignetting, etc. The preset diaphragm step number signifies the number of steps for presetting the closing of the diaphram from the totally opened F value of a mounted interchangeable lens. Memory device 21 stores the signal representing a predetermined time coming from the operation device in accordance with the brightness of the object to be photographed. The shutter time control device 5 is supplied with the signal either from shutter time setting device 4 or from memory device 21 regardless of whether the charge completion signal from flash unit exists so as to operate the shutter accordingly. The discrimination signal producing device 22 delivers the discrimination signal to switching device $SC_1$ of the afore mentioned flash unit SD through the terminal. This causes the switching device $SC_1$ functionally to engage the flash unit SD with the camera CA. If terminal d′ of the flash unit serves simultaneously as terminal c′, terminal d of camera CA must serve simultaneously as terminal c. The aperture information producing 23 delivers the absolute aperture value information of the preset diaphragm from the camera to the flash unit through the terminal c, c′. If device 23 includes the film speed information, it is not necessary to provide the film speed information addition device 78 of the flash unit SD as mentioned above.

In operation in the flash unit is connected to the camera CA shown in FIG. 4. When either flash unit SD or SA is mounted on camera CA or when the unit SD or SA is mounted on the camera CA but the charge has not yet been completed, namely during day-light exposures, no charge completion signal is delivered from the flash unit to the camera through the terminal b. Therefore charge completion indicator 6 provided in the view finder does not operate while switching device $SC_3$ remains set at the position shown in the drawing. Consequently, through device 21 which stores the output of the memory device 9 which is supplied with the signals from the afore mentioned devices 8 and 10′ and from the shutter time control device 5, the shutter operates at the desired speed in accordance with the object brightness, the film speed and the preset aperture value so as to obtain the proper daylight exposure. If the charge has not been completed with the flash unit mounted, 1S remains out of operation by means of the flash light device 4S so that the flash light device does not operate in the same way as in case of the camera CT in such a manner that a picture can be taken with the proper exposure under day-light.

If the flash unit is mounted on the camera CA and the flash unit is ready for operation, the charge completion indicator 6 provided in the view finder informs the photographer that the flash unit is ready for operation. The switching device $SC_3$ is set at the position opposite to that shown in the drawing such that the shutter time setting device 4, connected to the shutter time control device 5 through switching device $SC_3$ sets the shutter to a speed such as 1/60 sec. suitable for flash photography. Hereby it is possible to so design that usually the shutter time for the flash light photography is not constant as mentioned above but variable in accordance with the output of the operating device 9, while only when the output of the operating device 9 is not suited for flash light photography, the shutter operates with the time suited for flash light photography by means of the flash light shutter time setting device 4. The discrimination signal from discrimination signal producing device 22 is delivered to switching device $SC_1$ of the flash unit through the terminals $d$, $d'$ or the substitutes $c$, $c'$, thus setting switching device $SC_1$ to the side opposite that in the drawing. In accordance with the information signal from the camera CA the amount of light of the flash unit may therefore be controlled. When switching device $SC_1$ is set as mentioned above and switching device $SC_2$ is closed by the charge completion signal producing device 4S (Hereby switching device $SC_2$ may be omitted as mentioned above), the aperture information producing device 23 of camera CA delivers the preset absolute aperture value information signal on the photographic lens as well as the film sensitivity information signal to the flash light limit device 3S through the terminal $c$, $c'$ and switching devices $SC_2$, $SC_1$ (eventually the film speed information addition device 78). Device 3S is further supplied with the distance information from 6S. After the diaphragm is closed down to the preset aperture value, the shutter of the camera is released and the trigger device 1S actuates flash unit 2S. The flash light output of 2S is stopped by 3S as soon as the output reaches a certain determined value, so as to obtain the proper exposure for flash photography. After the operation of the flash unit at a time suitable for flash light photography as mentioned above, the shutter is closed. The photographer may recognize by the indicator 6 in the view finder that the flash light has operated in a manner similar to that of the camera shown in FIG. 3.

Even if the flash unit SA or SD is used in combination with camera CA shown in FIG. 4, such operations as the charge completion indication and the flash light operation indication in the view finder, automatic switching of the circuit, and the automatic switching of shutter time suited for flash photography are carried out similarly to those of camera CT. As for the diaphragm movement, if camera CT is used, the aperture value of the camera is controlled in accordance with the flash unit for obtaining the proper exposure. If camera CA is used, the amount of light of the flash unit is adjusted in accordance with the aperture value of the camera CA to obtain the proper exposure.

As explained above by means of the flash light device in accordance with the present invention the flash light photography can be carried out as easily as in case of the usual auto-exposure photography, when used in combination with either camera, whereby when the flash light device is mounted but not yet ready for operation alarm is made, while the camera operates for the usual auto-exposure photography so as to obtain the proper exposure under day-light, which is very convenient.

Hereby the camera CA (FIG. 4) is taken up as an example of the auto-exposure camera with priority on aperture value, whereby the cam need not alway to be the auto-exposure camera, and it is also possible to compose the auto-exposure camera with priority on the shutter time being provided with the aperture information producing device for controlling the flash light device. The discrimination signal producing device is provided on the camera CA but not on the camera CT so that the cameras CA and CT can easily be distinguished. The discrimination signal producing device may also be provided on camera CT and not on camera CA. It is possible to provide both cameras CA and CT with signal producing devices which produce signals distinguishable from one another.

An embodiment of camera CD which can be functionally engaged with any of the above mentioned flash units St, SA or SD is explained below. Like parts in the embodiment are identified by the same reference numerals present in the aforementioned cameras CT and CA. Newly added in the drawing is the shutter time indicator, 24 for which auto-exposure camera with priority on aperture value is used. Switching devices $ATS_1$ to $ATS_6$ are all set to the A terminals to set an aperture value priority while they are all set to the T side in the case of a priority on shutter time. If switching devices $ATS_1$ to $ATS_2$ are set to the side T, the camera CD operates in the same way as the afore mentioned camera CT (FIG. 3). If the switching devices are set to the side A the camera CD operates in the same way as the afore mentioned camera CA (FIG. 4), whereby the camera CD is composed of the devices of both of the afore mentioned cameras CT and CA. The composition and operation of camera CD is explained below.

One case involves the setting of switching devices $ATS_1$ to $ATS_6$ to terminal T while the flash is not mounted, or involves the mounted flash unit in which the charge has not been completed. This is the case the auto-exposure photography is carried out with priority on shutter time under the day-light, whereby in the same way as in case of the camera shown in FIG. 3, the diaphragm step number signal for obtaining the proper exposure is produced by the operation device 9, and once stored in the memory device 21 through the change over device $SC_4$ in such a manner that the desired aperture value is adjusted by means of the control device 11 before the operation of the shutter of the camera. On the other hand, the above mentioned diaphragm step number signal is put in the indication device 13 through the change over device $ATS_5$ and the operation device 12 so as to indicate the desired aperture value for example in the view finder. Instead of utilizing the switching device $ATS_5$ and the circuit system shown in the dotted line, the output of operation device 9 may also be entered into indicator 13 through memory device 21 and the operation device 12 so as to indicate the aperture value. On the other hand, the change over device $ATS_4$ is set to the side T the output of the operation device 9 is not put in the shutter time indication device 24 so that the indication device 24 is out of operation. Further the output of the operation device 9 is not applied to the shutter time control device so that the shutter operates in accordance with the shutter time setting device 3 set by means of the shutter dial.

When the camera is set in the shutter priority mode and the flash unit energized, the devices $ATS_1$ to $ATS_5$ are all set to terminal as in the case of the camera CT the shutter operates at speeds such as 1/60 sec. by means of the flash light shutter time setting device 4 and the shutter control device 5. As for the diaphragm, once the aperture value from the flash unit is stored in in 21 through the terminal c, the switching device $ATS_3$, device 19 and $SC_4$ and the diaphragm control device 11 operate so that the diaphragm is automatically set at the determined aperture value, indicated in device 13. In this way, the shutter and the diaphragm are controlled to obtain the proper exposure even for flash photography.

The case in which camera CD is set in the aperture priority mode with priority on aperture value is explained below. (Switching devices $ATS_1$ to $ATS_5$ are all set at sides opposite to those shown.) In this case the diaphragm is manually set with the preset ring by the photographer. Switching devices $ATS_4$ and $ATS_5$ are set at the side A, so that the diaphragm control device 11 and the indication device 13 are out of operation. Thus no inconvenience occurs.

The operation of the shutter and other devices is explained below. As in case of camera CA shown in FIG. 4, the output of operation device 9 which is supplied with the shutter time signal from devices 8 and 10' in accordance with the brightness of the object, is entered and stored in memory device 21 through switching device $SC_4$ normally set in the mode opposite to that shown. The shutter time signal is simultaneously entered into shutter time indicator 24 through switching device $ATS_4$ which is set to side A such that the shutter time is indicated in the view finder of the camera. If the flash unit is mounted and the charge has been completed switching device $SC_3$ is set to the side shown by means of the charge completion signal supplied through the terminal b. Thus as in case of camera CA shown in FIG. 4, the shutter operates with a time suitable for flash photography by means of the flash light shutter time setting device 4 which is supplied with this time in accordance with the brightness of the object by memory device 21 and shutter control device 5. If the output of memory device 21 corresponds to the time within a range suitable for the flash photography, the shutter operates such that the proper exposure of the principal object to be photographed is obtained with the flash light of the flash unit while those objects be photographed more distant than the principal object to be beyond the reach of the flash light are also photographed with the proper exposure. If the output of memory device 21 is out of a certain determined range, for example, if a focal plane shutter is set at 1/250 sec., the shutter is controlled by devices 4 and 5 so as to operate within a time such as 1/60 sec. capable of operating with flash light. If, on the other hand, the output of memory device 21 is too long a time for the hand to hold the camera, the shutter is controlled by devices 4 and 5 so as to operate with such ¼ sec. speeds as The shutter of the camera CD operates as mentioned above at the time of taking a photograph under flash light, whereby the connected flash light device SD is changed over by means of the aperture information producing device 23 presenting at the same time the function of the discrimination signal producing device 22 through the change over device $ATS_3$ set to the side A and comes to response with the information from the aperture information producing device 23 in such a manner than the flash light output is controlled in accordance with the distance from the object to be photographed, the aperture information set at the side of the camera and so on so as to obtain the proper exposure. The shutter of the camera CD operates in the same way as camera CA under daylight conditions so as to produce the proper exposure under day-light. In this way, the camera CD may be functionally engaged with the flash unit in any mode of operation.

Figure 5:
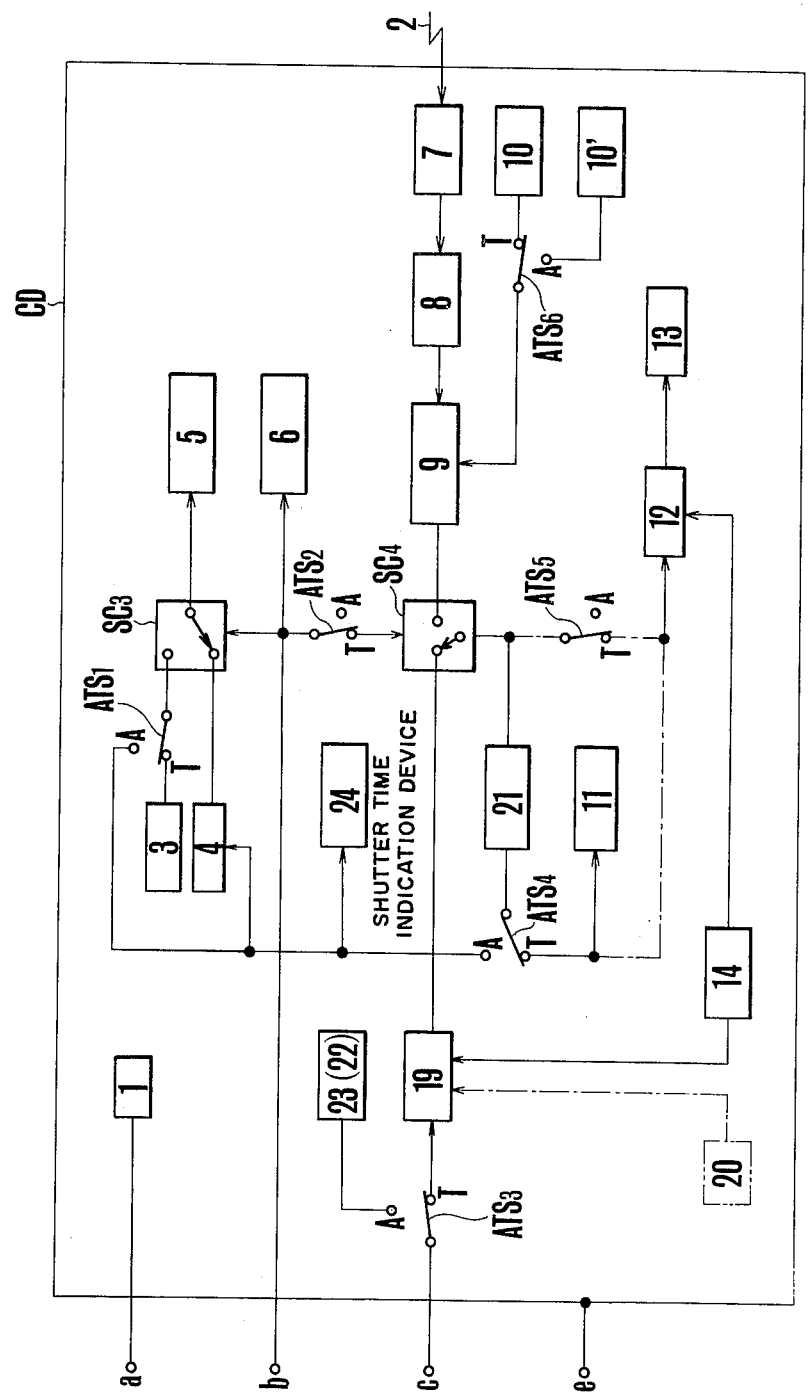
FIG. 5 shows a circuit diagram of an embodiment of the camera in accordance with the present invention, being used in functional engagement with various kinds of flash light devices.
Figure 6:
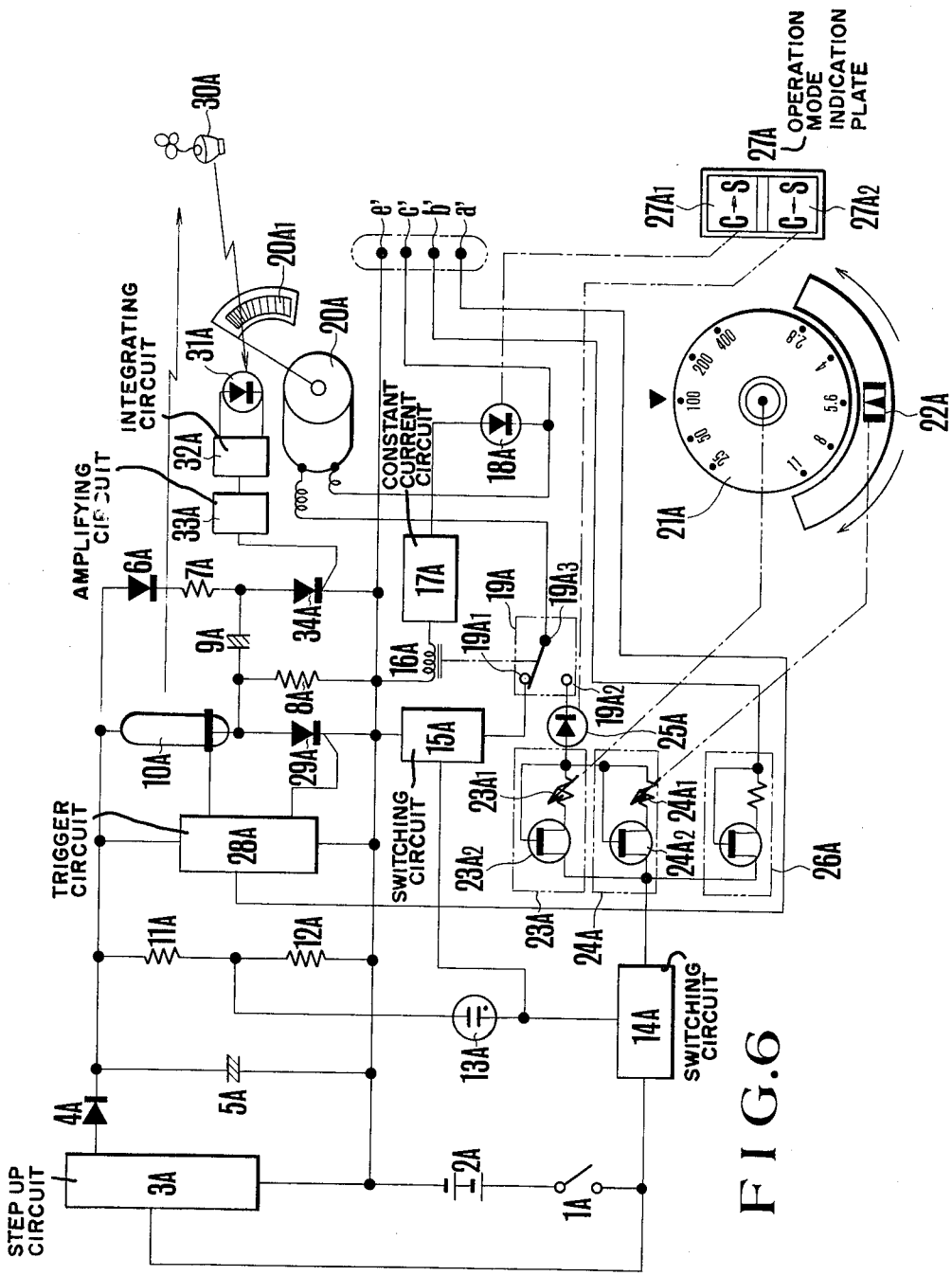
FIG. 6 shows a circuit diagram of an embodiment of the flash light device shown in FIG. 2.

The embodiments of the circuits of the flash unit and the camera will be explained in accordance with FIGS. 6 to 16 below. FIG. 6 shows a circuit diagram of an embodiment of the above mentioned flash unit SD. As explained in accordance with FIG. 2, both the first flash photographic mode with camera CT (FIG. 3) and the second flash photographic mode with camera CA (FIG. 4) are possible. Both and the second flash photographic mode are possible with camera CD (FIG. 5). When the current source switch 1A is closed, the current from current source 2A is stepped up by step up circuit 3A. The current is then rectified by the diode 4A and supplied to the main condenser i.e., compacitor 5A. Condenser or capacitor 9A for series control is charged through diode 6A and through resistors 7A and 8A. when the charge voltage of the main capacitor 5A reaches a predetermined value at which the flash light tube 10A may be actuated, the voltage divided by resistors 11A and 12A is applied to the neon tube 13A presenting the switching characteristics so as to illuminate the charge completion is indicated at the side of the flash unit, the switching circuits 14A as well as 15A being closed.

When, on the other hand, a voltage from the camera is applied between the terminals $e'$ and $c'$ of the flash unit connected to the corresponding terminals at the camera, a current runs from the terminal $e'$ to the terminal $c'$ through the relay 16A, the constant current circuit 17A and the illuminating diode 18A presenting the rectifying characteristics as diode in such a manner that the above mentioned diode 18A lights up while the contacts $19A_1$ and $19A_3$ of the switch 19A are brought in the connected state by means of the above mentioned relay 16A. In this way, a current runs between the terminals $e'$ and $c'$ through the switching circuit 15A closed by the neon tube, the switch 19A and the ampere meter 20A, whereby the current value is controlled by the aperture information producing device at the side of the camera so that the aperture information is delivered from the side of the camera to the side of the flash light device.

When either camera CD or camera CA is connected to the flash unit, switch 19A is set to terminal $19A_1$ by means of relay 16A as mentioned above.

When either camera CD or CT is used, switch 19A is set in the reversed state, no current being supplied between the afore mentioned terminals $e'$ and $c'$ from the camera. Therefore relay 16A does not operate so that terminal, $19A_2$ and $19A_3$ of switch 19A remain connected to each other. In this case, the variable resistances $23A_1$ and $24A_1$ are adjusted respectively in functional engagement with the film speed setting plates 21A and the flash light level setting plate 22A provided in the flash unit. By operating constant current circuits 23A and 24A which are compared respectively of variable resistances FET $23A_2$ and $24A_2$, a current corresponding to the set value of 21A and 22A is supplied from terminal $c'$ to the camera through the diode 25A, the switch 19A and the ampere meter 20A. The aperture information signal produced at terminal $c'$ out of the current from current source 2A is the signal compressed in accordance with the circuit characteristics of the camera such as the so called APEX signal which varies by a certain determined value for one step number variation of the diaphragm.

Other components of the flash unit and their functions are explained below. When the charge has been completed after closure of current source switch 1A the neon tube 13A of the flash unit illuminates so as to indicate the completion of the charge while switching circuit 14A is closed so that the charge completion signal is produced at terminal $b'$ through the constant current circuit 26A. Thus the shutter time control circuit, the indicator and the alarm circuit of the camera are switched into the operational state for flash photography meanwhile in the view finder, the charge completion is indicated.

If the flash unit is connected to either camera CT or to camera CD, no current is supplied between the terminals $e'$ and $c'$ from the camera so that the relay 16A does not operate and the switch is connected at terminal $19A_2$. In this way, the current corresponding to the set values of the film speed as well as the flash light level, namely the current corresponding to the aperture value to be adjusted is produced at the terminal $c'$ through the illuminating diode 25A, the switch 19A and the ampere meter 20A. Thus the diaphragm control circuit and indicator as well as the alarm circuit of the camera operate in accordance with this aperture information. In this case, the current runs through illuminating diode 25A, which lights up, when the latter illuminates $27A_2$ of the operation mode indication plate 27A of the flash unit this indicates that the diaphragm is in a position to be controlled in accordance with the set mode of the flash unit. When on the contrary the amount of light of the flash unit is controlled in accordance with the set aperture value the, the illumination diode 18A illuminates $27A_1$ to indicate it.

When the shutter of the camera is released while the switch 19A is at the side $19A_2$ as mentioned above, by means of the charge completion signal as well as the aperture information signal delivered to the side of the camera the diaphragm and the shutter an automatically control for the flash light photography. When the synchronization switch connected camera terminal $a'$ is closed in synchronism with the shutter, trigger circuit 28A of the flash unit is actuated through the common terminal $e'$. Not only is the flash light discharge tube 10A triggered but switching element 29A is closed by means of the output pulse of 28A so that tube 10A produces light. By the actuation of the flash light discharge tube 10A the light reflected by object 30A (or direct light) reaches light sensing element 31A through the light amount adjusting plate $20A_1$ provided on ampere meter 20A. Plate 20A, adjusts the amount of passing light, which is translated in accordance with the current value. The output of the light sensing element 31A is integrated by the integrating circuit 32A in such a manner that the switching element 34A is closed through the amplifying circuit 33A when the integrated output reaches a certain determined value. By means of the closure of the switching element 34A, the charge in the condenser 9A runs to the switching element 29A along the reversed direction so as to open the element. In this way, the flash light output of flash light discharge tube 10A stops.

As explained above, the diaphragm of the camera is adjusted in accordance with the values set at the film speed setting plate 21A and the flash light amount level setting plate 22A of the flash unit the amount of light is controlled according to the afore mentioned set values delivered through the light amount adjusting plate $20A_1$ so as to produce the proper exposure.

The operation in which either camera CA or camera CD set in such a state is connected with the flash unit is explained below. A current corresponding to the aperture information is delivered between the terminals $e'$ and $c'$ from the camera such that illumination diode 18A illuminates $27A_1$, while switch 19A is set to terminal $19A_1$. When the neon tube 13A lights up and switching circuit 15A is closed, a current corresponding to the aperture value of the camera flows from terminal $e'$ to terminal $c'$ through 15A, 19A and 20A. Consequently the aperture information is entered into flash light amount control circuit through light amount adjusting plate $20A_1$ so that the amount of light is controlled to produce the proper exposure. During the afore mentioned operation switch 19A remains at the terminal $19A_1$ so that the set values at setting plates 21A and 22A are not influenced at all this avoids inconvenience.

To whichever, camera the flash light device shown in FIG. 6 may be connected the operation mode of the flash light device is automatically changed over so as to obtain the flash light amount for the proper exposure while the camera is automatically changed over for the flash light photography by means of the charge completion signal or the like, which is remarkably convenient.

In accordance with FIG. 2, a terminal $d'$ for receiving the discrimination signal from the camera may be provided separately such that the current runs from terminal $d'$ to terminal $c'$ through 16A, 17A and 18A so as to switch the operating mode. When the film speed data is entered in to the control circuit of camera CT even while taking a flash photograph it is possible to eliminate the constant current circuit 23A. When the information is not entered into the control circuit of camera CA it is necessary to provide a constant current circuit such as 23A for the film speed information together with the switching circuit 15A.

In the above mentioned embodiment switch 19A is automatically changed over by means of the relay 16A. It is also possible to make switch 19A a manual switch, thus eliminating relay 16A. In this case, the indication of the operation mode or the set state by illuminating diodes 18A and 25A and the operation mode indicating plate 27A is very effective.

An embodiment of the circuit of flash unit SD has been described. Other flash units such as ST or SA in FIG. 1 are constructed by altering a part of the circuit shown in FIG. 6.

To construct the flash unit ST we start with the circuit of FIG. 6, and the switch 19A is eliminated while terminals $19A_2$ and $19A_3$ are permanently connected to each other. Therefore the above mentioned members 15A to 18A may be eliminated.

To construct the unit SA the switch 19A is eliminated while terminals $19A_1$ and $19A_3$ are connected permanently. It goes without saying that in this case not only circuits 23A to 25A but also the members 16A to 18A may be eliminated. If diode 18A remains connected between the terminals $e'$ and $c'$ with flash unit ST coupled will indicate this by lighting when it is connected to camera CA by mistake, while diode 25A lights when the operation is carried out correctly. Further, with flash unit CA, illumination diode 18A lights when the operation is carried out correctly while it does not when the the operation is impossible.

Figure 7:
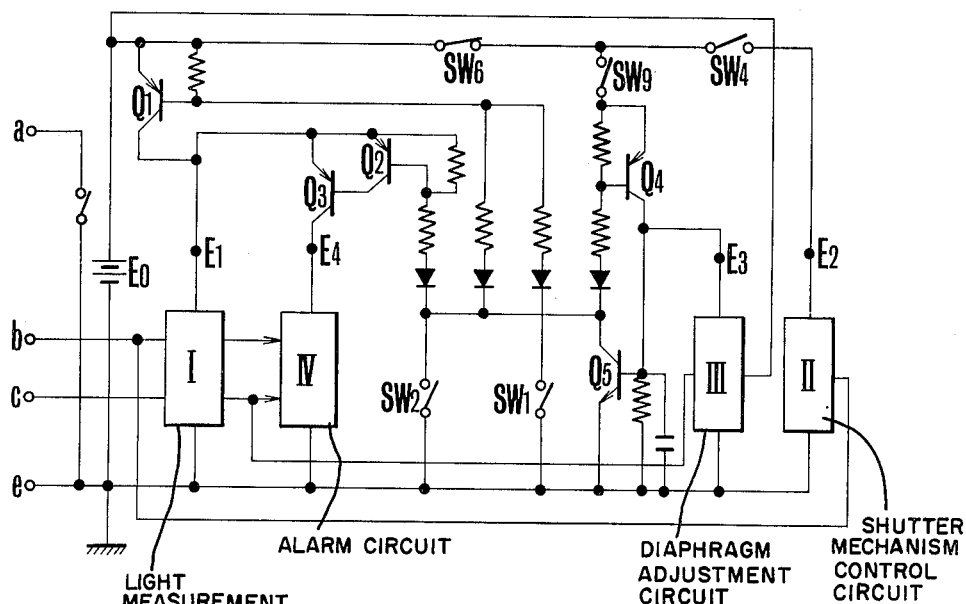
FIG. 7 shows a circuit diagram of an embodiment of the camera with priority on shutter time shown in FIG. 3.

The circuit diagram of the embodiment of the camera CT shown in FIG. 3 is disclosed in detail in FIG. 7 to FIG. 11. FIG. 7 shows a circuit diagram mainly of the current supply circuit in the device of the camera shown in FIG. 3. The current source of the camera, Eo, supplies the current for circuits, I, II, III and IV. The first circuit I carries out light measurement for day-light photography. Circuit I also performs the charge completion indication corresponding to the input information from the flash unit for flash photography. Only if the charge completion signal from the flash unit is entered into the circuit, does the circuit automatically change over into the flash light photographic mode. The second circuit II controls the shutter mechanism in accordance with the shutter time set at the shutter time setting dial for day-light photography. For flash photograph circuit II is automatically switched over to control the shutter mechanism in accordance with shutter time (such as 1/60 sec. which is) suitable for flash photography. The third circuit III adjusts the diaphragm of the photographic lens up to the aperture value set for day-light and flash photography in accordance with the input from the first circuit I, composed of the circuit for controlling the starting time of the rise of the mirror and the electronic self timer circuit. The fourth circuit IV is the alarm circuit for indicating the adjustment of the aperture value for day-light photography in accordance with the input fron the first circuit I. Circuit IV also produces and alarm if the aperture value is out of the adjustable range. The data to be entered into the circuit at the camera from the outside include the data from the flash unit, the object brightness information from the light sensing element, and the film sensitivity information as well as the manually set shutter time information.

Below the outline of the operation of the camera CT is explained in accordance with the circuit shown in FIG. 7. At the first step of the release operation of the shutter switch $SW_1$ is closed, when the transistors $Q_1$ and $Q_3$ are into the switched on in such a manner that the first and the fourth circuit are supplied with current from the current source. In this way, an output corresponding to the object brightness information from I or the information from the flash unit are entered into circuit W. Thus the determined aperture value is indicated. When this value is out of the adjustable range of the diaphragm of the mounted interchangeable lens the alarm is set off. Then at the second step of the release operation of the shutter the switch $SW_2$ is closed, and the transister is switched off so as to interrupt the current supply to the fourth circuit. Transistor $Q_4$ is switched on so as to supply current to the third circuit through the switches $SW_6$ and $SW_9$. Thus the magnet of holding circuit III operates to elevate the mirror. The switch $SW_4$ is closed during the upward movement of the mirror so as to supply current to the second circuit II. About at this time, the magnet for controlling the diaphragm is adjusted by the third circuit in such a manner that the diaphragm of the photographic lens is adjusted down to the determined aperture value in accordance with the input from the first circuit I. After elevation of the mirror and adjustment of the diaphragm, the front shutter plane starts to run. Simultaneously the time count starting switch is opened, the second circuit in awaiting state starts to operate. After the elapse of a certain predetermined time the magnet for controlling the rear shutter plane operates and the rear shutter plane closes so as to complete the exposure. After that mirror begins to fall. During the downward operation of the mirror switch $SW_4$ is opened. Switch $SW_6$ prevents misoperation. The latter closes when the film has finished winding and opens with the start of the rear shutter plane. Switch $SW_9$ economizes on the current and closes only immediately after the film begins to wind. After the completion of the first exposure when the film is wound manually or by means of the motor drive device the shutter mechanism is charged and all the mechanisms are brought into their initial states.

In the above mentioned operations the diaphragm adjusted by the third circuit III or the shutter time controlled by the second circuit II respectively the aperture and the shutter time for the flash light photography, in case the flash light device is connected to the terminals $a - e$ in a state ready for operation, in such a manner that the flash light device is actuated by means of the synchronization switch to be closed at the same time with the operation of the shutter. Even if the photographer takes his hand away from the shutter button after the start of the mirror mechanism and others after the operation of the magnet in the holding circuit of the third circuit III, the output information of the first circuit is stored in the memory circuit and the operation is carried out smoothly. This is done by means of the self-holding circuit such as a condenser i.e. capacitor inserted to the base of $Q_5$. The current circuit continuous to supply current to the second circuit by means of switches $SW_6$ and $SW_4$ until completion of the operation.

Figure 8:
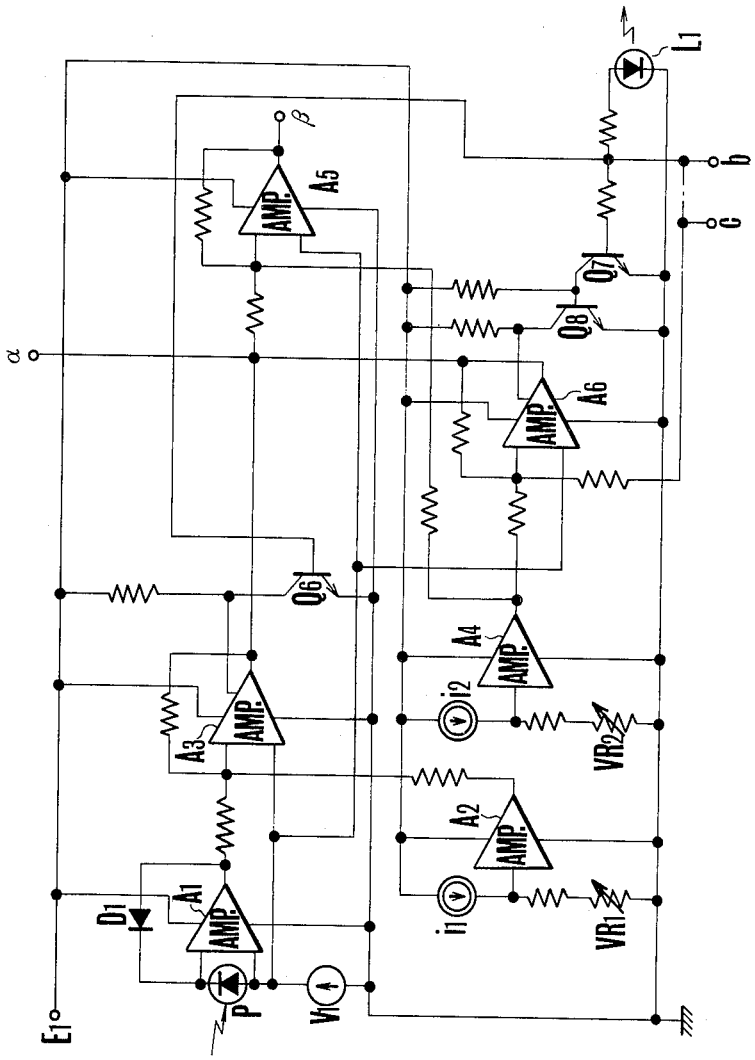

FIGS. 8 to 11 show the detailed diagrams of the four circuits shown in FIG. 7. In FIG. 8, the light sensing element is designated as P, and, a photoelectric transducing element such as silicone blue cell is arranged in the view finder of the TTL system. A logarithm diode $D_1$ is connected into the feedback route of amplifier $A_1$ of the light measurement circuit so as to obtain the logarithmically compressed output. The film shutter, the shutter time as well as the compensation of vignetting due to the TTL, totally opened light measurement, are set at the variable resistance $VR_1$ connected to the input terminal of the amplifier $A_2$ of the photographic data setting circuit. The output of amplifier $A_2$ is combined with that of amplifier $A_1$ and entered into amplifier $A_3$ of the operation circuit. These data are all utilized by operational amplifier $A_3$ which produces the information of the diaphragm step number at output terminal 2. This aperture information is entered into the diaphragm control circuit shown by IV in FIG. 7. The output of the amplifier $A_3$ is combined with that of the amplifier $A_4$ of the second information setting circuit to whose input terminal a variable resistance $VR_2$ is connected on which the totally opened aperture value F of the photographic lens is set and put in the second operation amplifier $A_5$, at whose output terminal $\beta$ a signal corresponding to the absolute aperture value is produced. Operational amplifier $A_6$ operates during flash exposure. Switching transistors, $Q_6$, $Q_7$, and $Q_9$ are reversed by the charge completion signal from the flash unit for opening and closing the bias of $A_3$ amplifiers and $A_6$. Illumination diode $L_1$ or a lamp arranged at an appropriate place in the view finder optical path, lights up when the flash unit is discharged so as to indicate the latter's readiness for operation.

The operation of the circuit shown in FIG. 8 is as follows. When the flash unit is not connected to the circuit or when the flash unit is connected to the circuit the charge has not yet been completed, no voltage is applied to the input terminal b connected to the flash unit so that operation amplifier $A_3$ operates by means of the effect of the bias control transistors $Q_6$, $Q_7$, and $Q_8$. Meanwhile operational amplifier $A_6$ remains out of the operational state. Thus the automatic exposure control with priority on shutter time works by means of the data associated with the object brightness information entered into the light sensing element. In case of the TTL totally opened light measurement, the amount of the light incident to P is a value composed value of the object brightness (Bv), the totally opened aperture value (Avo) of the photographic lens and the vignetting (Avc) which occurs when the lens of the light measuring optical system is especially bright. Consequently, the terminal of the operational amplifier $A_1$ exhibiting a compression characteristic, carries, information in form of APEX value, namely (Bv − Avo − Avc). The variable resistance $VR_1$ which is connected to amplifier $A_2$, has set therein the film speed (Sv), the shutter time (Tv) and the vignetting compensation (Avc) entered by means of the compensating pin of the photographic lens. The output terminal of the amplifier $A_2$ carries their composite value (Sv + Avc − Tv) is produced. The output of amplifier $A_1$ is combined with that of amplifier $A_2$ and entered in the amplifier $A_3$. At the output terminal of the amplifier $A_3$, the information (Bv + Sv − Tv − Avo) is produced. This is (Av − Avo), the diaphragm step number signal for showing the number of the steps by which the photographic lens is to be adjusted from the totally opened value F. This information is produced at the output terminal $\alpha$. On the other hand, the totally opened F value information set on the variable resistance $VR_2$ of the photographic lens is produced by the amplifier $A_4$, combined with the output (Av − Avo) of the above mentioned amplifier $A_3$ and put in the operation amplifier $A_5$ at whose output terminal the absolute aperture value (Av) is produced. This information Av is produced at the output terminal $\beta$ of the operation amplifier $A_5$ and put in the indication - alarm circuit. When the flash light device is ready for operation, the charge completion signal is put in the terminal b from the flash light device, whereby by means of the effect of the above mentioned change over transister the amplifier $A_3$ is brought in the non-operation state while the amplifier $A_6$ is brought in the operation state, whereby the indication diode (or the lamp) $L_1$ light up to as to tell the photographer that the charge has been completed. After the operation of the flash light device by triggering the charge completion signal to the terminal b is interrupted for a while, so that the diode extinguishes for a while in such a manner that the operation of the flash light device can be confirmed through the view finder. In this case the amplifier is in the non-operation state and therefore no information corresponding to the object brightness is produced either at the output terminal $\alpha$ nor at the terminal $\beta$ while the output corresponding to the aperture information put in from the flash light device through the input terminal c is produced. The absolute aperture value signal from the flash light device and the totally opened F value from the amplifier $A_3$ are put in the operation amplifier $A_6$ at whose output terminal the diaphragm step number information (Av − Avo) is produced and delivered to the diaphragm control circuit from the terminal $\alpha$. On the other hand the diaphragm step number signal and the totally opened F value signal from the amplifier $A_4$ is put in the amplifier $A_5$ at whose output terminal a signal corresponding to the absolute aperture value to be adjusted is produced and delivered to the indication - alarm circuit from the terminal $\beta$.

As explained above, the circuit shown in FIG. 8 is driven by the current source $E_1$ in such a manner that the operation mode is automatically changed over either for the day-light photography or for the flash light photography and a necessary information is produced either at the terminal $\alpha$ or at the terminal $\beta$.

Figure 9:
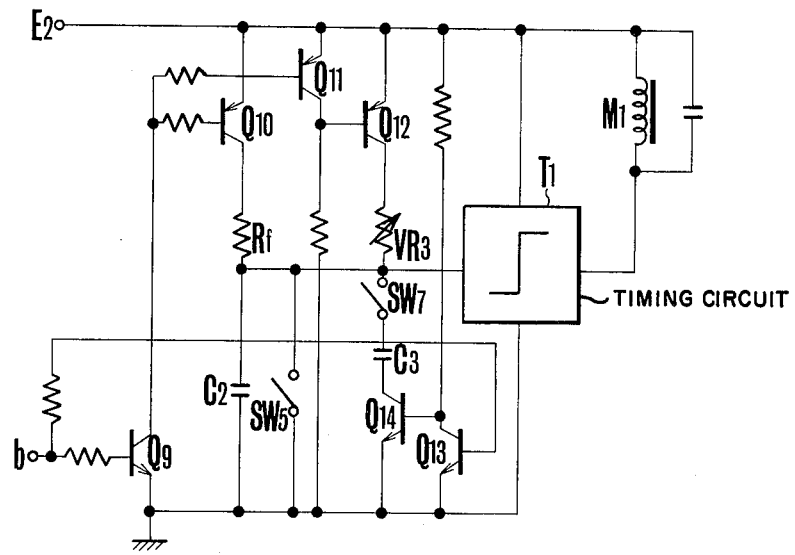
FIGS. 8 to 11 respectively show the circuit diagram of an embodiment of the first, the second, the third and the fourth circuit part.

FIG. 9 shows the detailed diagram of the second circuit shown in FIG. 7. This circuit is supplied with a current from the current source $E_2$, while the charge completion signal is put in the input terminal b from the flash light device. In the drawing, $VR_3$ is a variable resistance to be set in functional engagement with the shutter time setting dial, $c_2$ and $c_3$ the time constant condensers which are connected in parallel by means of the switch $SW_7$ to be closed depending upon the set range of the above mentioned shutter time setting dial in case of the long time photography. $T_1$ is a timing circuit such as Schmitt circuit, $M_1$ is the magnet for controlling the starting time of the rear shutter plane, $SW_5$ the time count starting switch and Rf the time constant resistance element for obtaining the time suited for the flash light photography whereby when the charge completion signal is put in from the terminal at the time of taking a photograph under flash light the resistance $VR_3$ is changed over to the resistance Rf in the time constant circuit by means of the effect of the transisters $Q_9 - Q_{12}$ so as to obtain a shutter time for example 1/60 sec. Hereby the transisters $Q_{13}$ and $Q_{14}$ are intended to cut the condenser $C_3$ from the circuit independent of the mode of the switch $SW_7$ at the time of taking a picture under flash light. The operation of the circuit shown in the drawing is as follows. In case of the day-light photography a current is supplied to the circuit from the current source $E_2$ whereby no charge completion signal is put in the terminal b from the flash light device so that the transisters $Q_{10}$ and $Q_{11}$ is in the switched off state, while the transister $Q_{12}$ is in the switched on state so as to connect the variable resistance $VR_3$ to the circuit. At the same time, when the front shutter plane is released so as to start to run, the switch $SW_5$ is opened, the condenser $C_2$ (or $C_2$ and $C_3$) is charged through the variable resistance $VR_3$, after the elapse of a certain determined time, the timing circuit $T_1$ is inversed, the magnet $M_1$ operates and the rear shutter plane starts to run so as to close the shutter. In case of the flash light photography, the charge completion signal is put in the terminal b whereby the transisters $Q_9$ and $Q_{10}$ are in the switched on state while the transister $Q_{12}$ is in the switched off state, so that instead of the variable resistance $VR_3$ the resistance Rf is connected to the circuit, while the transister $Q_{13}$ is in the switched on state and the transister $Q_{14}$ is in the switched off state so that only the condenser $C_2$ is connected to the time constant circuit. In this way with the shutter time decided by the resistance Rf and the condenser $C_2$, namely the shutter time suitable for the flash light photography the timing circuit $T_1$ is inversed so as to carry out the exposure. This change over of the shutter time is automatically carried out, any misoperation due to the negligence of the shutter time or the eventual movement of the set component can take place.

Figure 10:
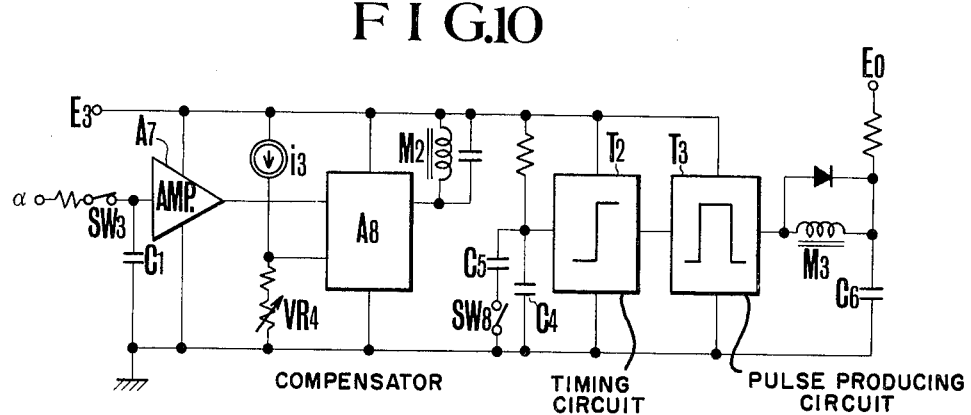

FIG. 10 shows the detailed diagram of the third circuit shown in FIG. 7. A current is supplied to this circuit from the current source Eo through the switches SW$_6$ and SW$_9$ while another current is also supplied to a part of this circuit directly from the current source Eo whereby the electrical power is very small. Further, the diaphragm step number information (A$v$ − A$vo$) corresponding to the object brightness from the first circuit or the information from the flash light device is put in the input terminal α. The diaphragm step number signal put in the terminal α is applied to the memory condencer C$_1$ through the memory switch SW$_3$, so as to be stored there. After the storing the voltage of the condenser C$_1$ is kept even if the switch SW$_3$ is opened. The diaphragm step number signal stored in the condenser C$_1$ is put in the compensator A$_8$ through the buffer A$_7$. $i_3$ is the constant current source for the variable resistance VR$_4$, whereby the signal from the resistance VR$_4$ variable in accordance with the number of the steps by which the photographic lens is adjusted from the totally opened F value is compared with the stored step number signal from the above mentioned amplifier A$_7$ by the comparater A$_8$ in such a manner that when the both signals corresponds with each other the diaphragm control magnet M$_2$ is operated by means of the output of the comparater A$_8$. C$_4$ is the time constant condenser for delaying a little the operation time of the magnet M$_3$ in the holding circuit, while C$_5$ is the time constant condenser for closing the switch SW$_8$ so as to delay the operation time of the magnet M$_3$ for example by eight seconds in case the self-timer is used. T$_2$ is the timing circuit, T$_3$ the pulse producing circuit and C$_6$ the condenser for driving the magnet M$_3$. The operation of the circuit is as follows. At first the current source E$_3$ is connected by the release operation and after the elapse of a little time decided by C$_4$ and so on the timing circuit T$_2$ is inversed in such a manner that a pulse is produced at the output terminal of the pulse producing circuit T$_3$, so as to operate the magnet M$_3$. By means of the operation of the magnet M$_3$ the mirror starts to rise up and nearly at the same time the memory switch SW$_3$ opens. The aperture information stored in the memory condenser C$_1$ and the signal from the resistance VR$_4$ variable in accordance with the displacement amount of the diaphragm preset member of the photographic lens to be operated after the operation of the magnet M$_3$ are put in the comparater A$_8$, so as to be compared with each other there in such a manner that when the both signals correspond with each other the magnet M$_2$ operates so as to determine the stopping position of the diaphragm preset member. By means of this position the diaphragm of the photographic lens is adjusted at the determined value by the operation of the automatic diaphragm lever at the time of taking a photograph. In stead of engaging the variable resistance VR$_4$ with the diaphragm preset member, the resistance VR$_4$ can be engaged with the member connected directly with the diaphragm blades. Hereby as the mechanisms for operating the magnet M$_2$ and adjusting the diaphragm of the photographic lens, the device mentioned in the Japanese Pat. Application Sho 47-123633 applied by the applicant of the present invention can be utilized.

In case of the self-timer photography, the switch SW$_8$ is closed by the manual operation so as to delay the operation time of the magnet M$_3$ for example by eight seconds.

Figure 11:
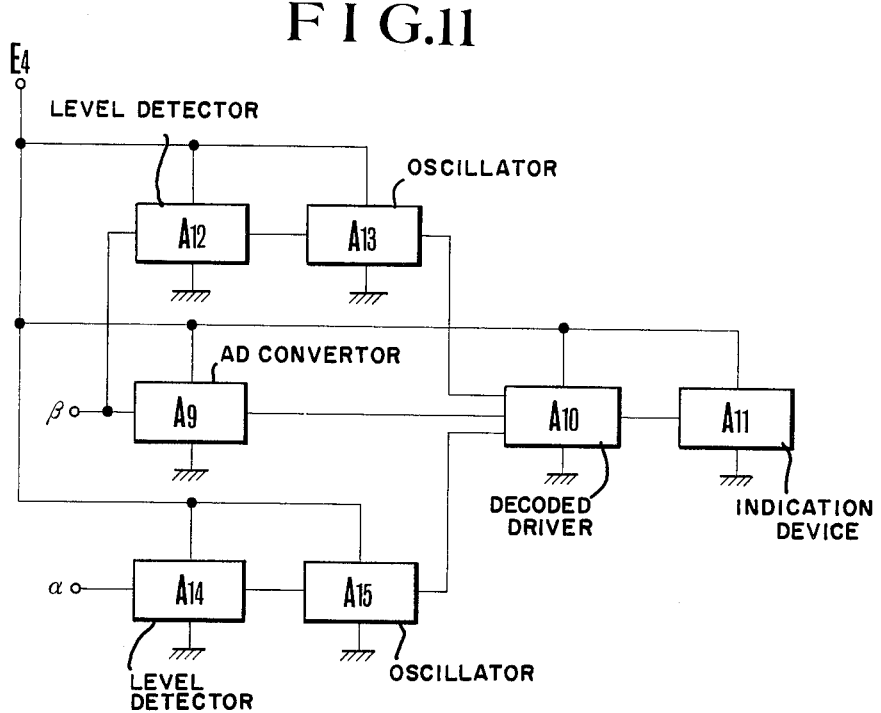

FIG. 11 shows the detailed diagram of the fourth circuit shown in FIG. 7. A current is supplied to this circuit from the current source Eo through the transister change over circuit, while the diaphragm step number signal as well as the absolute aperture value signal are put in this circuit from the first circuit through the input terminals α and β. The current is supplied to this circuit between the closure of the switch SW$_1$ functionally engaged with the first step of the release and the closure of the switch SW$_2$ functionally engaged with the second step of the release. In the drawing, A$_9$ is the AD-converter for converting the analog signal of the aperture put in the terminal β into a digital signal, whereby the digital signal produced at the output terminal is decoded by the decoded driver A$_{10}$ into a signal suited for indication so as to be applied to the indication device A$_{11}$. A$_{11}$ consists of for example seven segment illumination diode elements, whereby the aperture value corresponding to the absolute aperture value signal put in the terminal β is indicated in letter figures, when this indication reaches the aperture limit value, for example F$_{22}$ or more, the level detector A$_{12}$ detects the fact so as to control the oscillator A$_{13}$ to make the indication by the indication device A$_{11}$ twinkle for alarm. On the other hand, the diaphragm step number signal put in the terminal α is detected by the level detector A$_{14}$ in the same way in such a manner that when the signal reaches the limit value for example F1.4 or more of the mounted photographic lens the oscillator A$_{15}$ is controlled so as to make the indication by the indication device A$_{11}$ twinkle for alarm. Also in case of the flash light photography the signal put in the terminal α and β is automatically changed over in the first circuit so that the indication and the alarm are carried out in the same way as mentioned above. Hereby the circuit shown in FIG. 11 is so designed that the aperture indication device twinkles for alarm, whereby the alarm can be made by extinguishing or darkening the indication device. Further it is possible to provide another alarm indication device. Further it is possible to indicate the aperture not by the lamp indication but by an ampere meter.

As explained above in case of the camera CT shown in FIGS. 7 to 11 at the time of taking a photograph under the daylight at the first step of the release operation the aperture value to be adjusted by the film speed, the shutter time and the object brightness is indicated while it is also alarmed when the value is out of the adjustable range, and at the second step of the release operation the diaphragm of the photographic lens is automatically adjusted to the above mentioned value while the shutter operates with the set time for obtaining the proper exposure. At the time of taking a photograph under flash light by means of the flash light device ST or SD all the circuits for indication and alarm, the diaphragm control as well as the shutter time control are automatically changed over for the flash light photography while the charge completion signal is indicated in the view finder at the time of taking a photograph under flash light.

Below an embodiment of the circuit showing in detail the camera in the embodiment shown in FIG. 4 will be explained in accordance with FIG. 12(a).

In the drawing, 101 is the current source of the camera and 102 the current source switch. In case of this camera the common terminal e with the flash light device is, as is shown in the drawing, connected to the positive electrode of the current source contrary to the above mentioned camera CT. 103 is the light sensing element, whereby a photoelectric converting element such as silicone blue cell is arranged in the view finder optical system of the TTL system, 104 is the amplifier (for example an operation amplifier) of the light measuring circuit in whose feed back route a logarithm diode 105 is connected so as to obtain a logarithmically compressed output. 106 is the amplifier of the photographic information setting circuit, whereby at the variable resistance 107 connected to the input terminal of the amplifier the film speed, the number of steps by which the diaphragm is adjusted from the totally opened F value and the compensation of the vignetting due to the TTL totally opened light measurement are set while the output of the photographic information setting circuit 106 is combined with the output of the amplifier 104 and stored in the memory condenser 109 through the memory switch 108. The value stored in the memory condenser 109 assumes the same voltage for operating the shutter with the same time independent of the totally opened F value of the mounted interchangeable lens in case the preset aperture value and so on are same namely the photographic conditions are same. 110 is the constant voltage circuit for stabilizing the operation of the above mentioned circuit. 111 is the count starting switch to be opened at the same time of the operation of the front shutter plane, whereby when the switch 111 is opened the current corresponding to the voltage of the condenser 109 storing the time corresponding to the object brightness measured before through the memory switch 108 to be opened before the rising up of the mirror is charged in the condenser 113 through the transistor 112. In this way, pulse corresponding to the shutter time enlarged up to the actual time is produced at the output terminal of the trigger circuit 114 and delivered to the magnet for controlling the starting time of the rear shutter plane. 115 is the AND circuit for the day-light photography wthout using a flash light, whereby the one input terminal 115a is connected to the output terminal of the trigger circuit 114 composing the above mentioned electronic shutter circuit while the other input terminal 115b is connected to the collector of the transistor 116 to be brought in the switched on state by means of the charge completion signal from the flash light device in such a manner that an output is produced at the same time with the output of the above mentioned trigger circuit after the shutter release when the flash light device is not mounted on the camera or even if the flash light device is mounted the charge has not yet been completed. 117 is the control AND circuit for low speed whose input terminal presents the first input terminal 117a for the above mentioned charge completion signal, the second input terminal 117b for the current from the current source and the third input terminal 117c connected to the output terminal of the control time constance circuit for low speed consisting of the resistance 118 and the condenser 119. The AND circuit 117 is so designed as to produce an output in for example ¼ sec. after the contact 121 is closed at the same time with the operation of the synchronization contact 120. 122 is the control AND circuit for high speed whose input terminal present the first input terminal 122a supplied with the above me̊ntioned charge completion signal, the second input terminal 122b connected to the output terminal of the above mentioned trigger circuit and the third input terminal 122c connected with the output terminal of the control time constant circuit for high speed consisting of the resistance 123 and the condenser 124. AT the output terminal of the AND circuit 122 an output is produced after the elapse of for example 1/60 sec. after the closure of the synchronization contact by means of the release operation of the shutter. 125, 126, 127 and 128 are the resistances, while 129 is a transister which is brought in the switched on state at the same time when the contact 121 is closed together with the synchronization switch 120 in such a manner that a control signal is applied to the gate of the switching element 130, so as to close the element 129. 131 and 132 are the transisters which are brought in the switched off state at the same time of the closure of the above mentioned switching element 130 in such a manner that the time constant circuit presenting the above mentioned condensers 119 and 124 is operated so as to start the counting. 133, 134 and 135 are the diodes, while 136 is the transister which is brought in the switched off state by means of the output of the above mentioned circuits 115, 117 and 122 so as to demagnetize the magnet 137.

Below the operation of the camera CA with priority on aperture shown in FIG. 12(a) will be explained in accordance with an embodiment. In case no flash light device is mounted on the camera or even if a flash light device is mounted the charge has not yet been completed, no voltage is applied to the terminal b to be connected to the flash light, being kept at the potential at the minus side of the current source 101 so that no input signal is delivered to the input terminal 117a and 122a of the AND circuits 117 and 122. In consequence the AND circuits 117 and 122 can never be brought in the AND state. On the other hand, the voltage of the current source is applied to the input terminal 115b of the AND circuit 115 by means of the closure of the current source switch 102 because the transister 116 is in the switched off state. When then the count starting switch 111 is opened at the same time with the start of the front shutter plane by means of the release operation of the shutter the condenser 113 is charged through the transister 112 with the current corresponding to the voltage of the condenser 109 storing the time corresponding to the object brightness as mentioned above. When the condenser 113 is charged up to a certain determined voltage the trigger circuit 114 operates whereby the potential at its output terminal becomes equal to that of the current source. The potential at the output terminal of the trigger circuit 114 is conveyed to the input terminal 115a of the AND circuit 115 so that the AND circuit 115 produces an output together with the input terminal 115b at the potential of the current source in advance. The output is applied through the diode 135 to the base of the transister 136 so as to open it so that the magnet 137 is demagnetized whereby in a conventional way the rear shutter plane is released so as to terminate the exposure. In case the flash light device is not yet ready for operation the AND circuits 117 and 122 never operate while on the other hand, the trigger circuit 114 operates at a certain determined time in accordance with the object brightness, the preset aperture value, the film speed and so on whereby the AND circuit 115 operates at the same time with the trigger circuit 114 so as to obtain the proper exposure under the daylight.

In case either the flash light device CA or CD is mounted on the camera CA and the charge has been completed the charge completion signal is conveyed to the terminal b in such a manner that the illumination diode 138 provided in the optical path of the view finder of the camera illuminates for indication while the input signal is delivered to the input terminals 117a and 122a of the AND circuits 117 and 122. Then by closing the current source switch 102 of the camera the current source voltage is put in the input terminal 117b of the AND circuit 117. Hereby the current source voltage is applied between the collecter and the emitter of the transister 116 in such a manner that the base of the transister 116 is at a high potential by means of the above mentioned charge completion signal, so that the transister 116 is closed. In consequence the potential at the input terminal 115b of the AND circuit 115 is never raised whereby at taking a photograph under flash light the AND circuit 115 has nothing to do with the control of the shutter time. On the other hand, the output of the trigger circuit 114 is put in the input terminal 122b of the AND circuit 122 at a desired time in accordance with the object brightness in the same way as in case of the day-light photography, serving as the voltage of the current source. Further the input signal is put in the input terminals 117c and 122c of the AND circuit 117 and 122 after the elapse of the time determined by the resistance 118 and the condenser 119 or by the resistance 123 and the condenser 124 because either the transister 129 and the switching element 130 are closed or the transisters 131 and 132 are brought in the switched off state by means of the closure of the switch 121 at the same time with the synchronization switch 120 to be opened when the front shutter plane is totally opened.

The input terminals 117a and 117b of the AND circuit 117 are at the above mentioned potential so that after the elapse of the time determined by the resistance 118 and the condenser 119 the AND circuit 117 meet the AND condition so as to produce an output.

When now the time determined by the resistance 118 and the condenser 119 is set at the value corresponding to the time limit for the manual holding, for example ¼ sec., the AND circuit 117 produce an output after ¼ sec. after the start of the front shutter plane without fail only at the time of taking a photograph under flash light whereby the transister 136 is brought in the switched off state through the diode 134 so as to actuate the magnet 137.

Hereby the input terminal 122a of the AND circuit 122 is at the above mentioned potential by means of the charge completion signal whereby the input signal is put in the input terminals 122b and 122c respectively at the above mentioned time. In consequence the AND circuit 122 produces an output by means of the one of the input signals respectively put in the input terminals 122b and 122c later than the other. When now the time determined by the resistance 123 and the condenser 124 is set at a value corresponding to the limit time for the flash light photography, for example 1/60 sec. in case of focal plane shutter, at the time of taking a photograph the AND circuit 122 produces an output after the elapse of more than 1/60 sec. after the start of the front shutter plane. Namely, the trigger circuit 114 operates at the desired time in accordance with the object brightness and so on in the same way as in case of the day-light photography whereby the output is put in the input terminal 122b of the AND circuit 122, whereby in case the signal corresponds to a shutter time shorter than 1/60 sec., an output is produced at the same time a signal corresponding to 1/60 sec. is put in the input terminal 1/60 sec., bringing the transister 136 in the switched off state through the diode 133 and actuating the magnet 137 so as to start the rear shutter plane. In case the time in accordance with the object brightness and so on is too long the AND circuit 122 produces an output at the same time with the operation of the trigger circuit 114.

Below the shutter operation in case of the flash light photography will be explained briefly, the operation of each of the above mentioned components being summarized. When the charge completion signal is put in the terminal b as mentioned above, the illumination diode 138 lights up for indication while the AND circuit 115 is changed over into non-operation state and the AND circuits are changed over into operation state. The AND circuit 117 produces an output at the time corresponding to the shutter time, namely ¼ sec., while the AND circuit 122 produces an output at the time corresponding to the shutter time, namely 1/60 sec. or produces an output at the same time with the trigger circuit 114 operating later. Further the output terminal of the AND circuit 117 and that of the AND circuit 122 are both connected to the base of the transister 136, which is brought in the switched off state by means of the one of the signals from the transisters 117 and 122 earlier than the other in such a manner that the magnet 137 is excited so as to start the rear shutter plane. In consequence when the object is so bright that the time determined by the result of the light measurement is very short, by means of the AND circuit 122 the shutter is operated with a time capable of the flash light photography for example 1/60 sec., while the object is so dark, by means of the AND circuit 117 the shutter is operated with the limit time for manual holding, for example ¼ sec. so as to prevent the inproper operation. Further in case the time determined by the result of the light measurement is between 1/60 sec. and ¼ sec., the shutter is operated by means of the output signal of the AND circuit 122 so that the object too distant to be illuminated by the flash light from the flash light device is photographed with proper exposure under day-light (including tangsten light). At the time of taking a photograph under flash light also the light from the flash light device is put in the light sensing element 103 of the above mentioned light measurement circuit, whereby the memory circuit 108 is opened before the operation of the flash light device so that there is no danger that the shutter time should become shorter, being influenced by the flash light.

At the time of taking a photograph under flash light the shutter at the side of the camera operates as mentioned above while the flash light device operates as follows. Between the terminal c at the side of the camera and the negative electrode of the current source 101 a constant current circuit consisting of a variable resistance 139 and a field effect transister FET 140 is connected. The variable resistance 139 being so composed that its value is adjusted in accordance with the absolute preset aperture value and the film speed, the camera is connected to the above mentioned flash light device (FIG. 6), when a pressure is applied between the terminals e' and e at the side of the flash light device corresponding to the terminals e and c at the side of the flash light device from the current source 101. In this way, the flash light device is automatically changed over into the operation mode for the camera. Further the value of the current running from the terminal e' to c' of the flash light device is controlled by the above mentioned constant current circuit consisting of the variable condenser 139 and the field effect transister FET 140 at the side of the camera so that the information of the conditions set at the side of the camera is put in the flash light device. When the release is operated in this state, the synchronization switch 120 closes when the front shutter plane is totally opened, whereby the terminals e' and $a'$ of the flash light device are short circuited in such a manner the flash light is produced by the operation of the trigger circuit. As explained above, the informations corresponding to the light reflected from the object to be photographed, the aperture value of the diaphragm at the time of taking a photograph and so on are put in the flash light amount control circuit of the flash light device so as the flash light output is ceased at the time point at which the flash light amount for giving the proper exposure amount to the film is reached. After that the shutter closes after the time determined for the flash light photography.

The constant current circuit consisting of the resistance 141 and the field effect transister FET 142 shown by dotted line in FIG. 12(a) corresponds with the discrimination signal producing device 22 shown in FIG. 4, whereby in case the terminal $d$ is provided as shown in the drawing instead of $c$ the illumination diode 18A of the flash light device shown in FIG. 6 is disconnected from the terminal $c'$ and connected to the newly provided terminal $d'$.

As explained above, the camera CA shown in FIG. 12(a) acts as an auto exposure camera with priority on aperture in case of the day-light photography, while in case of the flash light photography the aperture information and so on necessary for the flash light device is produced so as to control the flash light amount whereby the shutter time is adjusted for the flash light photography so as to obtain the proper exposure automatically.

Figure 12B:
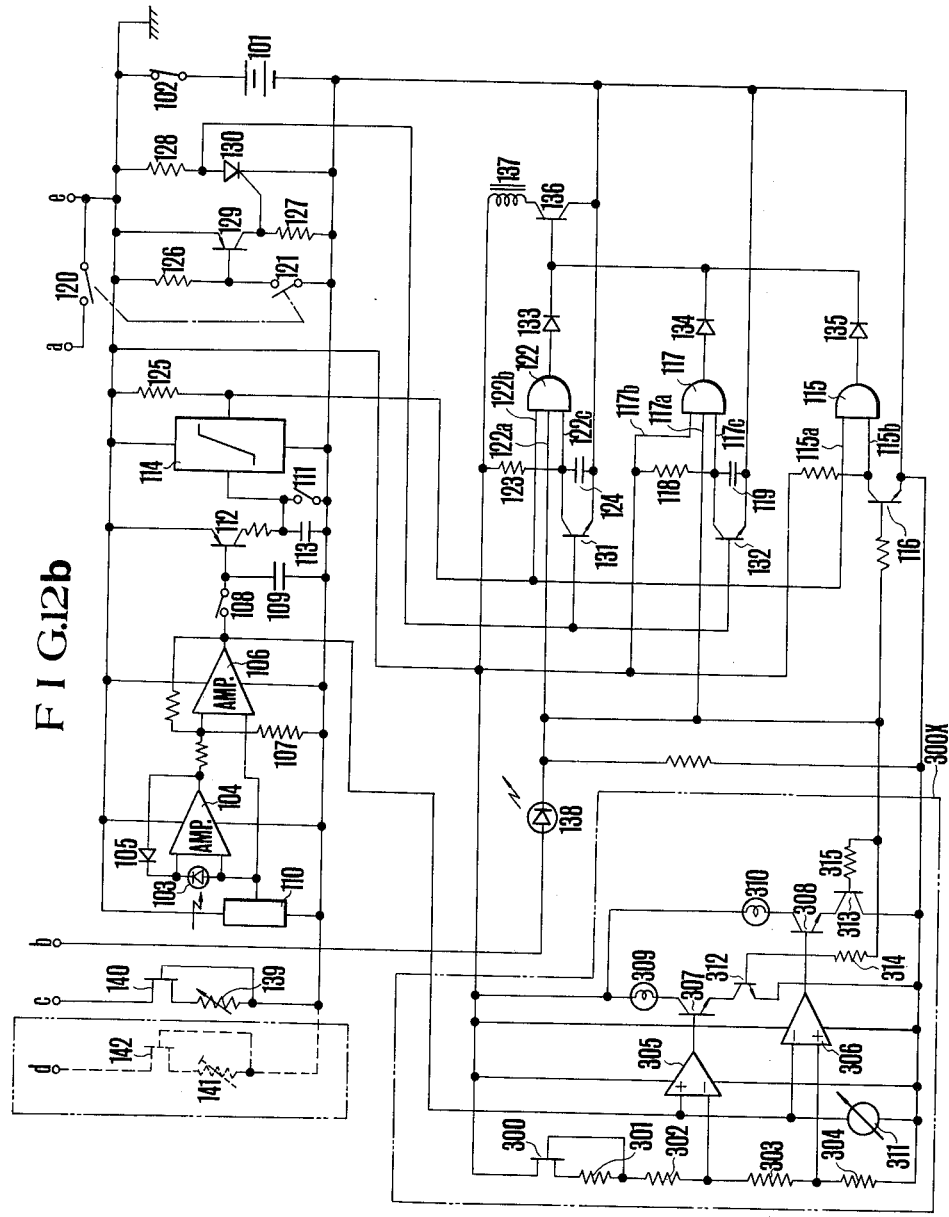
FIG. 12(b) shows a circuit diagram of a variation of the camera shown in FIG. 12(a).

FIG. 12(b) shows a variation of the camera CA shown in FIG. 12(a). In case of the flash light photography, the shutter time is limited, whereby it is indicated by a newly added circuit 300X. In the present embodiment, the shutter speed at the side of high speed is limited up to 1/60 sec. so as to be applied for the focal plane shutter, whereby the limit value of the shutter time is indicated. The shutter speed at the side of the low speed is limited up to ¼ sec. the limit of the manual holding being taken into consideration, whereby the limit value of the shutter time is indicated. In the drawing FET 300 and the resistance 301 compose a constant current circuit. 302 to 304 are the resistances for setting level. The voltage at the positive side of 304 is the non-inversed input voltage of the comparater 306, being set at a level equivalent to the output voltage of the amplifier 106 in case the shutter time is 1/60 sec. The voltage at the positive side of the resistance 304 is the inversed input voltage of the comparator 305, being set at a level equivalent to the output of the amplifier 106 in case the shutter time is ¼ sec. 309 and 310 are the alarm lamps showing that the shutter time is at the limit value.

Figure 12C:
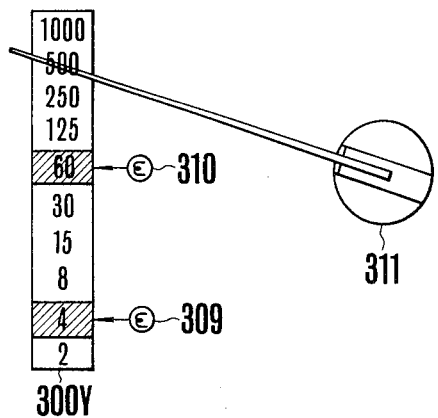
FIG. 12(c) shows the then mode of indication.

FIG. 12(c) shows the above mentioned state. In the drawing, 300Y is the shutter time indicating part, 311 the ampere meter, 309 and 310 the above mentioned alarm lamp.

The operation of the compositions shown in FIG. 12(b) and (c) is as follows. In case the shutter time at the time of the auto-exposure with priority on aperture is shorter than 1/60 sec. the output voltage of the amplifier 106 is lower than the voltage at the positive side of the resistance, whereby the comparator 306 is inversed so as to bring the transister in the switched on state in such a manner that the limit alarm lamp 310 in the indication part of 1/60 sec. lights up for alarming. In case the shutter time at the time of auto-exposure with priority on aperture is longer than ¼ sec., the output voltage the amplifier 106 is higher than the voltage at the positive side of the resistance 303 whereby the comparator 305 is inversed so as to bring the transister 307 in the switched on state in such a manner that the limit alarm lamp 309 in the indication part of ¼ sec. lights up. Hereby 312 to 315 compose the circuits for operation the above mentioned limit alarm lamp in case of the flash light photography with the charge completion signal. In case the shutter time is between 1/60 sec. and ¼ sec., the shutter time is not limited whereby the above mentioned limit alarm lamp does not light up.

Figure 12E:
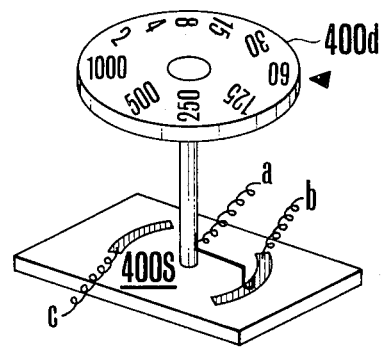
FIG. 12(e) shows the then composition in perspective view.
Figure 12F:
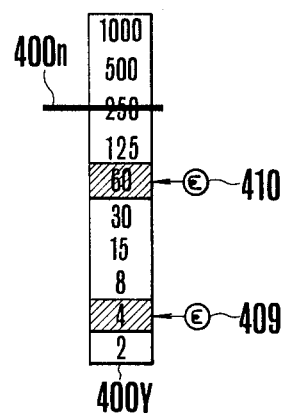
FIG. 12(f) shows the then mode of indication.
Figure 12D:
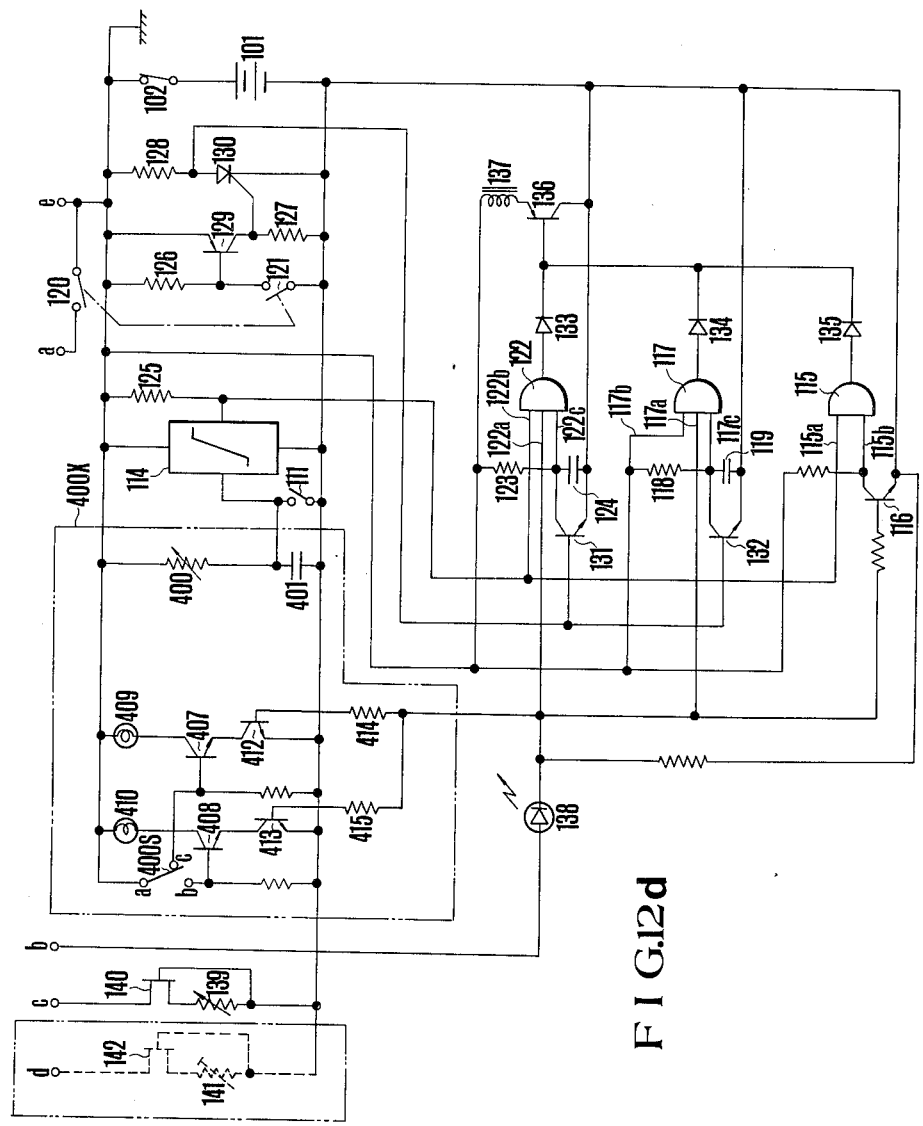
FIG. 12(d) shows a circuit diagram of an application.

FIG. 12(d), (e) and (f) show the application of the alarm indication shown in FIG. 12(b). Namely the circuit 400X is provided in such a manner that the shutter time limit is indicated at the time of taking a photograph under the flash light in case of the auto-exposure with priority on shutter time. In this case 400S is the switch in functional engagement with the shutter time setting dial 400d as is shown in FIG. 12(e), whereby in case the shutter time is set shorter than 1/60 sec. the contacts $a$ and $b$ are connected to each other, while in case the shutter time is set longer than ¼ sec. the contacts $a$ and $c$ are connected to each other. 400 is the variable resistance in functional engagement with the shutter time setting dial for producing an analog-signal, 301 the integrating condenser. FIG. 12(f) shows the then indication state, whereby 400Y is the shutter time indication part. 409 and 410 are the limit alarm lamps for indicating that the shutter time is in the limit state. 400n is the indication finger in functional engagement with the shutter setting dial for indicating the set shutter time.

The operation of the composition shown in FIG. 12(d) (e) is as follows. In case a photograph is tried to be taken under the flash light while the shutter is set at a shorter time than 1/60 sec., the contacts $a$ and $b$ of the switch 400S are connected to each other in such a manner that the charge completion signal from the flash light device is put in the transister 413 so as to bring the transisters 408 and 413 in the switched-on state whereby the limit alarm lamp 410 lights up, showing that the shutter time is limited at 1/60 sec. When in this state the shutter is released a photograph is taken under the flash light with the limited shutter speed of 1/60 sec. In case the shutter time is set between 1/60 sec. and ¼ sec. the switch 400S is not connected either to the contact $b$ or to the contact $c$ so that the circuit 400S does not operate and the limit alarm lamp does not light up whereby a photograph is taken under the flash light with the set shutter time as explained above. When a photograph is tried to be taken under the flash light while the shutter is set at a longer time than ¼ sec., the contact $a$ of the switch 400S is connected to the contact $c$ and the charge completion signal from the flash light device is put in the transister 412 so as to bring the transisters 407 and 412 in the switched on state whereby the limit alarm lamp 409 lights up, showing that the shutter time is limited at ¼ sec. When then the shutter is released, a photograph is taken under the flash light with the limited shutter time of ¼ sec. in a similar way as in the above mentioned case. Thus even when the auto-exposure with priority on the shutter time is carried out, according to the present system the shutter time is automatically controlled into the proper one at the time of taking a photograph under flash light.

Below an embodiment of the camera CD corresponding to the circuit diagram shown in FIG. 5 will be explained in accordance with the circuits diagrams shown in FIG. 7 and FIGS. 13 to 16. In case of the camera CD, both the day-light photography and the flash light photography are possible in the one changed over mode in the same way as in case of the above mentioned camera CT as explained in accordance with FIG. 5 and in the other changed over mode in the same way as in case of the above mentioned camera CA. Thus the present embodiment corresponds to the camera CT shown in FIGS. 7 to 11 whose circuit is provided with the change over setting means and further a mechanism presenting the function of the camera CA shown in FIG. 12. The circuits shown in FIGS. 13 to 16 are all supplied with current from the same current supply circuit as shown in FIG. 7, composing the first to the fourth circuit (circuit I to circuit IV), respectively corresponding to those shown in FIGS. 8 to 11, whereby the same components present the same numerical figures. Below their compositions as well as their operations will be explained in accordance with the drawing.

Figure 13:
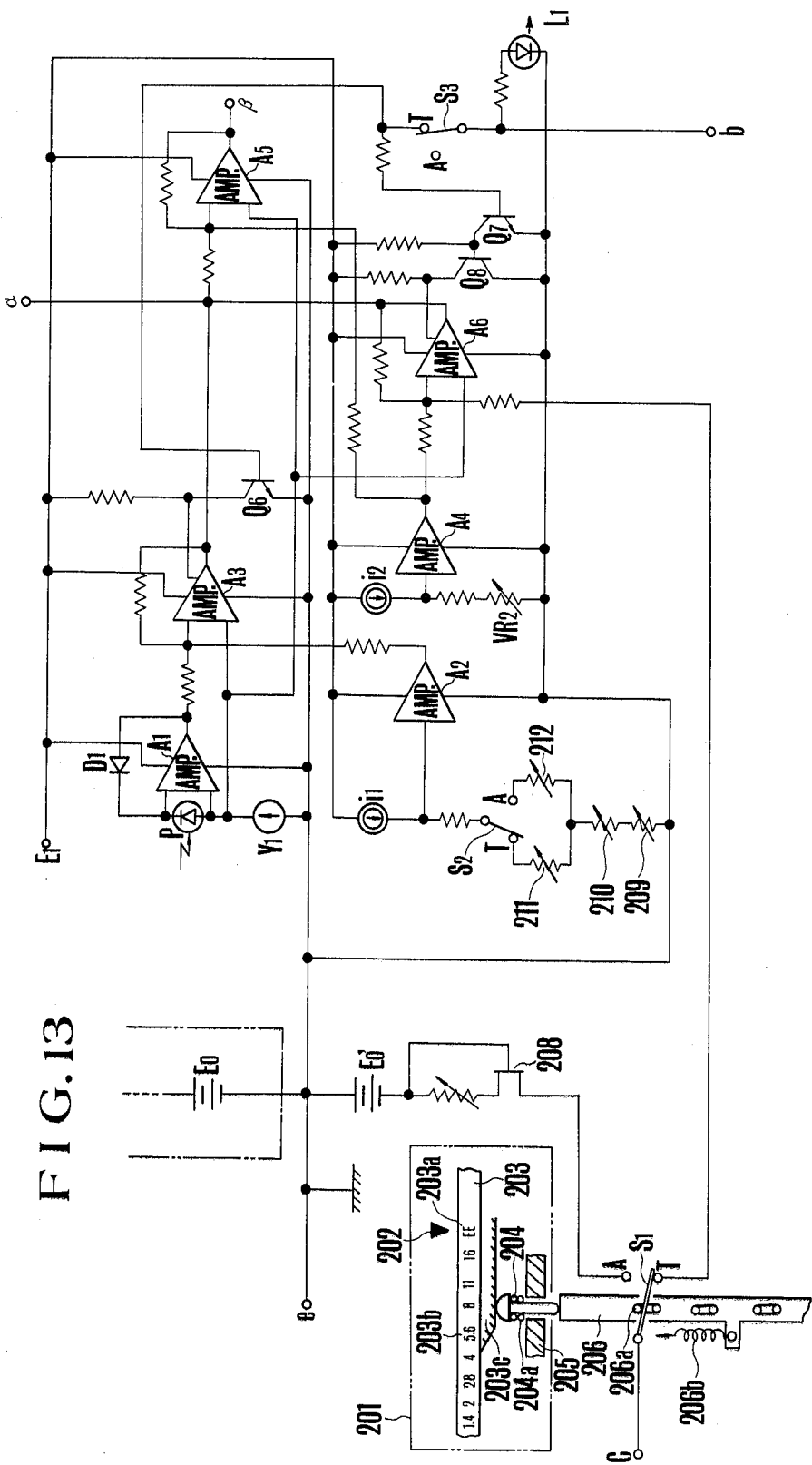

FIG. 13 shows the first circuit for the light measurement and the operation in case of the day-light photography, for the charge completion indication and the operation in accordance with the input information from the flash light device or for the supply of the information to the flash light device in case of the flash light photography, whereby only when the charge completion signal is put in the circuit from the flash light device the circuit is automatically changed over into the flash light photographic mode.

$E'o$ in FIG. 13 is the second current source connected in series with the current source $Eo$ in FIG. 7 by means of the terminal as is shown in the drawing. $S_1$ to $S_3$ are the switches which, in accordance with the set state of the change over setting means of the camera, are changed over to the side of T together with the switches $S_4$ $S_8$ shown in FIG. 14 to FIG. 16 to be explained later in case of the priority on shutter speed and to the side of A in case of the priority on aperture. An embodiment of the change over setting means will be explained in accordance with the drawing. 201 is the interchangeable lens presenting the diaphragm blades and so on capable of the automatic aperture setting, whereby the lens is provided with the fixed index 202, the aperture ring 203, the movable pin 204 movably adapted to the fixed member 205 and so on. When the EE mark 203a of the aperture ring 203 is set to the fixed index 202 as is shown in the drawing, the movable pin 204 is pushed out against the strength of the spring 204 by means of the cam face 203c. In this way the change over movable plate 206 at the side of the camera body is pushed downwards in the drawing against the strength of the spring 206b in such a manner that the change over switch $S_1$ is set at the side T by means of the provided insulation pin 206a. When the aperture scale 203b on the aperture ring 203 is set at the fixed index the cam face 203c is moved to the right in such a manner that the pin 204 as well as the movable plate 206 return upwards so as to change the switch $S_1$ over to the side A.

In case as mentioned above the interchangeable lens is set at EE in such a manner that the aperture of the lens is adjusted by means of the aperture control device at the side of the camera body, the switch $S_1$ is connected to the side of T, while the interchangeable lens is set at the aperture scale in such a manner that a photograph is taken with the aperture value desired by the photographer the switch $S_1$ is connected to the side A. In case all the above mentioned switches $S_2$ to $S_8$ are functionally engaged with the movable plate 206, it is possible for the photographer to change over the operation mode of the camera by only setting the aperture ring, without operating the shutter time setting dial. Further it is possible that all the switches $S_1$ to $S_8$ are not functionally engaged with the aperture ring but a part of them are functionally engaged with the shutter time setting dial (a setting position "AUTO" is provided on the shutter time setting dial in a conventional way), while it is also possible that all or a part of the switches $S_1$ to $S_8$ can be changed over by means of a change over operation member newly provided.

In the drawing 207 and 208 are respectively the variable resistance and the FET corresponding to 139 and 140 in FIG. 12, being intended to supply a current corresponding to the aperture information from the terminal $e'$ of the flash light device to the terminal $c'$ from the current source $E'o$ in case the switch $S_1$ is at the side of A.

209 and 212 are the variable resistances respectively for producing the informations of the film speed, the vignetting compensation necessary for the bright lens, the shutter time set by means of the shutter time setting dial and the number of the steps by which the aperture is adjusted from the preset totally opened aperture value F. Thus in case the switch $S_2$ is at the side of T as is shown in the drawing, the same information as in case of $VR_1$ shown in FIG. 8 is put in the operation circuit by means of the above mentioned resistances 209, 210 and 211, while in case the switch $S_2$ is at the side of A the same information as in case of 107 shown in FIG. 12 is put in the operation circuit by means of 209, 210 and 211.

Below the operation of the circuit shown in FIG. 13 will be explained. At first the case that the switches $S_1$ to $S_3$ are set at the side of T as mentioned above will be explained. In this case, as is clear from the drawing $Eo$, 207, 208 and 212 is disconnected from the circuit and therefore the circuit operates as the same circuit as shown in FIG. 8. Namely in case no flash light device is mounted or even if a flash light device is mounted, the charge has not yet been completed, the diaphragm step number signal and the absolute value signal operated in accordance to the object brightness and the time set on the shutter time setting dial so as to obtain the proper exposure are produced respectively at the terminal $\alpha$ and $\beta$, whereby the aperture control and the indication-alarm are carried out by means of a circuit to be explained later. Namely the auto-exposure photography with priority on the shutter time is carried out under the day-light, whereby the proper exposure is automatically obtained. Further in case the flash light device is mounted and the charge has been completed, the operation mode of the circuit is changed over while the indication lamp L lights up by means of the charge completion signal put in the terminal $b$ in such a manner that in accordance with the aperture information signal put in the terminal $c$ from the flash light device the diaphragm step number signal and the absolute value signal are produced at the terminals $\alpha$ and $\beta$. Thus the aperture control as well as the indication-alarm are carried out and the proper exposure is obtained under the flash light device.

Below the case that the switches $S_1$ to $S_3$ are connected to the side of A will be explained. In this case, the switch $S_3$ is opened, so that the operation amplifiers $A_3$ as well as $A_6$ are kept in the mode for the day-light photography no matter whether the charge completion signal exists or not. Further the switch $S_2$ is connected to the side of A so that at the terminal $\alpha$ a certain determined shutter time signal operated from the object brightness, the preset aperture value and so on is produced and stored in the circuit in FIG. 15 to be explained later so as to operate the shutter control circuit shown in FIG. 14. Hereby at the terminal β a signal different from the output at the terminal α is produced and delivered to the aperture indication-alarm circuit shown in FIG. 16, whereby there takes place no inconvenience because the circuit in FIG. 16 is out of the operation state. Further a voltage is applied between the terminals $e'$ and $c'$ at the side of the flash light device through the switch $S_1$ so as to produce a current in accordance with the set conditions at the side of the camera.

In consequence the auto-exposure photography is carried out with priority on aperture in case of the day-light photography without using the flash light device, while in case of the flash light photography the shutter time signal in accordance with the object brightness is produced in the same way as in case of the day-light photography, whereby at the same time with the charge completion signal the above mentioned flash light device CD is automatically changed over into the operation mode as CA in such a manner that the flash light amount of the flash light device is controlled in accordance with the information from the side of the camera.

Figure 14:
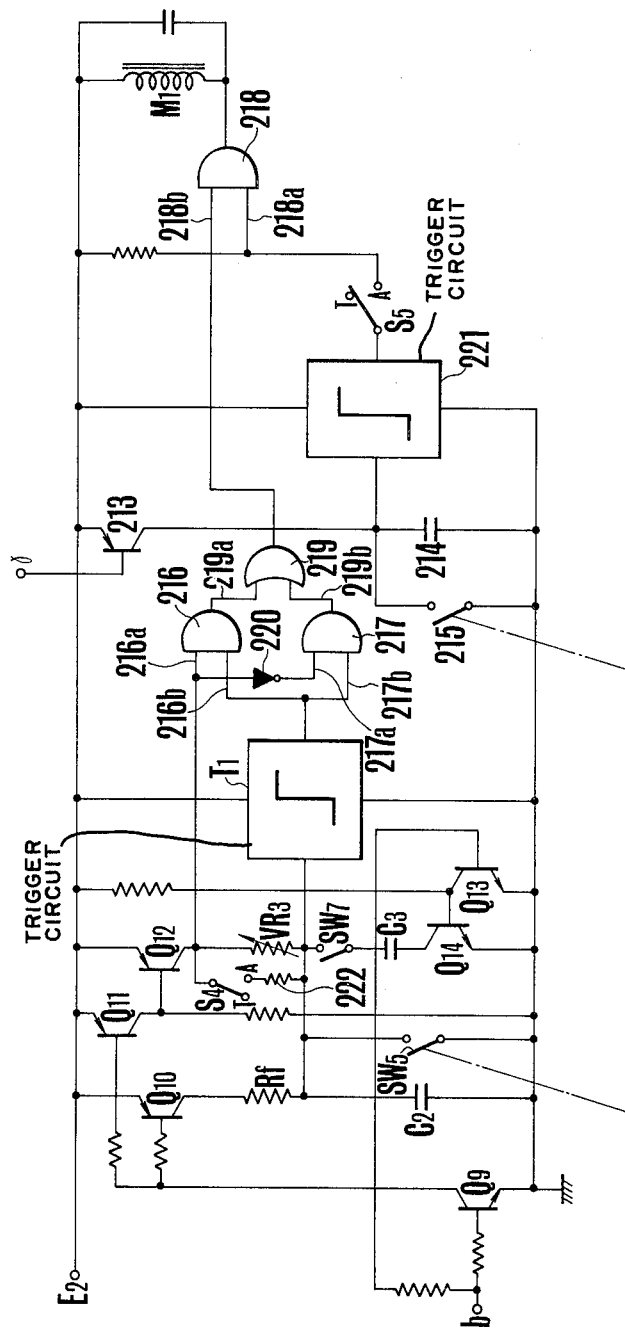

FIG. 14 shows the second circuit which controls the shutter mechanism in accordance with the time set on the shutter time setting dial or the operation result of the object brightness as well as the preset aperture value in case of the day-light photography while the circuit is automatically changed over so as to control the shutter mechanism with the time proper for the flash light photography in case of the flash light photography. As the shutter time in the present embodiment in case of the flash light photography, in case the camera is set so as to operate with priority on shutter speed (the first flash light photography) the shutter mechanism is controlled with constant speed in the same way as in case of the embodiment shown in FIG. 9, while in case the camera is set so as to operate with priority on aperture (the second flash light photography) the shutter mechanism is controlled with a time in accordance with the object brightness and so on within the range in which the control means does not operate, in the same way as in case of the embodiment shown in FIG. 12.

FIG. 14 shows a circuit shown in FIG. 9, being additionally provided with the change over switch $S_4$ and $S_5$, the transister 213 and the condenser 214 corresponding to 112 and 113 shown in FIG. 12, the count starting switch 215 opening and closing synchronizing with the switch $SW_5$ for prolonging the actual time, the AND circuits 216 to 218, the OR circuit 219, the inverter 220, the trigger circuit 211, the fine resistance 222 and so on. Below the operation of the circuit will be explained. In case the camera is set so as to operate with the priority on the shutter speed, the switch $S_5$ is opened as is shown in the drawing so that the input terminal 218a of the AND circuit 218 assumes the potential of the current source $E_2$, quite independent of the input from the terminal γ. Thus as soon as the signal from the "OR" circuit 219 is put in the other input terminal 218b, the magnet $M_1$ operates so as to start the rear shutter plane. On the other hand, the switch $S_4$ is also opened so that the trigger circuit $T_1$ produces the same output as in case of the embodiment shown in FIG. 9. No charge completion signal is put in the terminal be in case of the day-light photography so that the transister $Q_{12}$ is in the switched on state, whereby by means of the current source the potential at the input terminal 216a of the AND circuit is raised up. On the other hand, the input terminal 217a of the "AND" circuit 217 is connected through the inverter 220 so that the circuit 217 produces no output in the present case. When the front shutter plane starts to run by the operation of the release and the switch $SW_5$ is at the same time opened, the trigger circuit $T_1$ produces an output after the elapse of the time determined by the variable resistances adjusted in accordance with the value set at the shutter dial and the condenser $c_2$ (or $c_2$ and $c_3$). Thus the voltage at the other input terminal 216b of the "AND" circuit goes up so that the circuit 216 operates whereby a signal is put in the input terminal 218b of the "AND" circuit through the "OR" circuit 219. Thus the "AND" circuit 218 operates so as to actuate the magnet $M_1$ in such a manner that the desired shutter time set at the shutter dial is obtained.

On the other hand in case the charge completion signal is put in from the flash light device, namely in case of the flash light photography the transister $Q_{10}$ is in the switched on state while the transister $Q_{12}$ is in the switched off state. Thus the trigger circuit $T_1$ produces an output after the elapse of the time for example 1/60 sec. determined by the resistance $Rf$. Thus the trigger circuit $T_1$ produces an output after the elapse of the time for example 1/60 sec. determined by the resistance $Rf$. In this way, the voltages at the terminals 216b and 217b of the "AND" circuit 216 and 217 are raised or when the transister $Q_{12}$ has already been brought in the switched off state, the input terminal 217a of the "AND" circuit 217 is at the highest potential, the circuit 217 produces an output while the input terminal 218b of the "AND" circuit is also at the highest potential through the "OR" circuit 219 in such a manner that the magnet $M_1$ operates so as to obtain 1/60 sec. for the flash light photography.

As explained above, the circuit shown in FIG. 14 operates the shutter in accordance with the set position of the shutter time setting dial in case of the day-light photography with priority on shutter speed and with shutter time of 1/60 sec. independent of the set position in case of the flash light photography.

Below the case that the camera is set with priority an aperture will be explained. In this case the switch $S_5$ is at the side of A so that the shutter time is decided in accordance with the object brightness. The shutter time signal from the terminal α in FIG. 13 in accordance with the object brightness is once stored in the circuit shown in FIG. 15 to be explained later and then put in the terminal γ. Thus the stored compressed time information is enlarged into the actual time by the transister 213 and the condenser 214, converted by means of the trigger circuit 221 into the pulse signal and put in the input terminal 218a of the "AND" circuit. In this way the highest potential is applied to the input terminal 218a of the "AND" circuit 218 at the time determined in accordance with the object brightness. On the other hand, a high potential is applied to the input terminal 218b at the time point different from that in case of the photography with priority on the shutter time as explained later. In case of the day-light photography the transister $Q_{10}$ is in the switched off state while the transister $Q_{12}$ is in the switched on state as explained above. In consequence only the input terminal 216a of the "AND" circuit is at a high potential at the same time when the voltage is applied from the current source $E_2$. Further the switch $S_4$ is at the side of A, an output is produced at the output terminal of the trigger circuit $T_1$ immediately after the elapse a very short time (for example 1/1000 sec.) determined by the fine resistance 222 after the start of the front shutter plane. Thus the "AND" circuit 216 produces an output immediately after the start of the front shutter plane, bringing the input terminal 218b of the "AND" circuit 218 at a high potential through the "AND" circuit. In this way, the shutter operates with the time determined in accordance with the object brightness and so on in case of the day-light photography.

On the other hand, in case of the flash light photography the transister $Q_{10}$ is in the switched on state while the transister $Q_{12}$ is in the switched off state as mentioned above by means of the charge completion signal put in the terminal b. In consequence the input terminal 217a of the "AND" circuit 217 is brought at a high potential at the same time when a voltage is applied from the current source $E_2$. Further the trigger circuit $T_1$ produces an output after the elapse of the time for example 1/60 sec. determined by the resistance Rf, whereby the other input terminal 217b of the "AND" circuit 217 is also brought at a high potential. Thus the circuit 217 produces an output, bringing the input terminal 218b of the "AND" circuit 218 at a high potential through the "OR" circuit. As explained above in case of the flash light photography an input is put in the input terminal 218a of the "AND" circuit 218 at the time point in accordance with the object brightness while an input is put in the input terminal 218b at the time point corresponding to 1/60 sec. Thus the shutter operates with 1/60 sec. in case the object is bright, while the shutter operates with the time in accordance with the object brightness in case the object is darker so as to obtain the proper exposure for the flash light photography.

The shutter control circuit shown in FIG. 14, operates the shutter with the time set at the shutter time setting dial in case of the day-light photography with priority on shutter speed and with 1/60 sec. in case of the flash light photography with priority on shutter time. Further the circuit operates the shutter with the time in accordance with the object brightness and so on in case of the day-light photography with priority on aperture and with the time longer than 1/60 sec. and in accordance with the object brightness in case of the flash light photography with priority on aperture.

Figure 15:
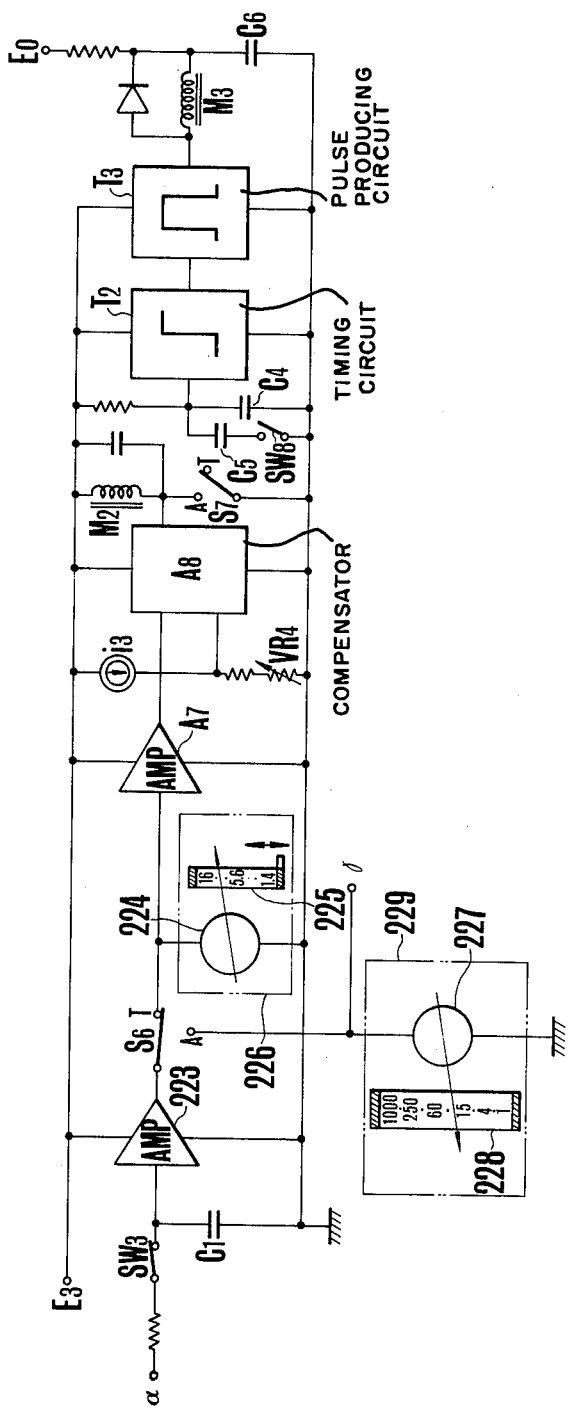

FIG. 15 shows the third circuit consisting of a circuit for adjusting the diaphragm of the photographic lens up to the determined aperture value in accordance with the input from the first circuit (FIG. 13) in case of the day-light photography as well as the flash light photography, a shutter time indication circuit, an aperture indication circuit, a holding circuit for controlling the starting of the mirror rising and an electronic self timer circuit.

The present embodiment corresponds to the circuit shown in FIG. 10 which is additionally provided with the change over switch $S_6$ and $S_7$, the buffer 223, the aperture indication device 226 consisting of an ampere meter 224 and the aperture scale plate 226 to be displaced in accordance with the totally opened F value of the mounted lens and the shutter time indication device 229 consisting of an ampere meter 227 and the shutter time scale plate 228. The diaphragm step number signal in accordance with the object brightness or the output of the flash light device is put in the terminal α from the circuit shown in FIG. 13 in case of the photography with priority on the shutter time (the switch at the side of T) while the shutter time signal in accordance with the object brightness is put in the terminal α no matter whether it is the day-light photography or the flash light photography. This signal is once stored in the condenser and at the same time operates the aperture indication device 226 or the shutter time indication device 229. Further the magnet $M_2$ is operated so as to control the aperture or the shutter control circuit shown in FIG. 14 through the terminal γ after the memory switch $SW_3$ is opened by the release operation. The electronic shutter circuit is same as that shown in FIG. 10 and therefore the explanation is omitted here. Further the diaphragm control system in case of the photography with priority on shutter time, corresponds to that shown in FIG. 10 which is additionally provided with buffer 223 so that the explanation is omitted. The aperture indication device 226 operating in case of the photography with priority on shutter time can be omitted in case that shown in FIG. 16 is provided so that it is sufficient to provide either one. The reason why the aperture scale plate 225 is displaced in accordance with the totally opened F value of the aperture scale plate 225 is that the position of the indication finger of the ampere meter 224 corresponds to the diaphragm step number value. The reason why the switch $S_7$ closing in case of the photography with priority on the aperture is that according to the composition of the diaphragm control mechanism controlled by the magnet $M_2$ it becomes impossible to adjust the diaphragm up to the preset aperture value automatically unless the magnet $M_2$ is kept in the excited state in case of the photography with priority on aperture (in case the diaphragm of the lens is manually preset). It goes without saying that it is possible to omit the switch $S_7$ depending upon the composition of the diaphragm control mechanism.

FIG. 16 shows an embodiment of the aperture indication device which can be omitted in case the embodiment shown in FIG. 15 is provided with the aperture indication device 226. This corresponds to that shown in FIG. 11, which is additionally provided with the change over switch $S_8$. In case the camera is used with priority on the aperture the indication of the aperture is not necessary and further there is a possibility of misoperation, so that the above mentioned switch $S_8$ is provided partly for the sake of economy of the power.

As explained above the camera CD in accordance with the camera shown in FIGS. 13 to 16 and being supplied with the current from the current supply circuit shown in FIG. 7 is capable of not only the auto-exposure photography with priority on the shutter time under the day-light but also the auto-exposure photography with priority on the aperture, whereby the first flash light photography with the flash light device ST, the second flash light photography with the flash light device SA and the first and second flash light photography are all possible. The camera CD can be said to be the one with remarkably wide field of application.

In case of the system with the flash light device presenting the information input and output terminals so far explained in detail in accordance with the present information the aperture information for adjusting the diaphragm is delivered to the side of camera from the output terminal producing the aperture information so as to enable the indication of the aperture value or the control of the diaphragm at the side of the camera, while in case the system is connected to the camera producing the aperture information, it is possible to control the flash light amount in accordance with the aperture information put in from the side of the camera. Namely although the device is a single flash light device, it is possible to carry out the flash light photography in functional engagement with a two system camera simply by adding simple components, so that the flash light system is remarkably effective in the economy and utilization.

Further, the present invention has many features as follows. The aperture information input terminal and the aperture information output terminal are combined in a common terminal so as to decrease the number of the terminals. The operation modes can be automatically changed over in accordance with the system of the connected camera. The necessary information can be produced so as to automatically change the diaphragm control circuit and the shutter time control circuit at the side of the camera over into the flash light photographic mode and so on.

What is claimed is:

1. A flash unit usable with either of a first camera whose control to diaphragm aperture is controlled for flash photography by a signal corresponding to the amount of light from an output terminal of the flash unit during flash photography, and with a second camera which controls the amount of light emitted by the flash unit by applying a signal corresponding to a preset diaphragm aperture value into the flash unit, said flash unit comprising:
   (a) flash means to generate a flash of light,
   (b) control signal forming circuit to form a control signal corresponding at least to the amount of light from the flash unit,
   (c) a light emission control circuit coupled to the flash means for detecting a signal corresponding to the diaphragm aperture value preset into the second camera to control the amount of light emitted by the flash means on the basis of the signal,
   (d) an external terminal to carry the control signal of said control signal forming circuit and to apply a signal corresponding to the preset diaphragm aperture value, and
   (e) a connection circuit for alternately connecting said external terminal with said control signal forming circuits or with said light emission control circuit so that when the external terminal and the control signal forming circuit are connected by the connection circuit a control signal corresponding to at least the amount of light emitted is produced from the external terminal so as to allow flash photography, and so that when the external terminal and light emission amount control circuit are connected a signal corresponding to the diaphragm aperture value set by the second camera is applied to the flash unit, thereby allowing flash photography by the second camera.

2. A flash unit according to claim 1, further comprising accumulation means connected to the flash means to accumulate the energy for generating light by said flash means, and a detection circuit coupled to said accumulation means to detect the energy level accumulated at said accumulation means and for generating an output when said energy reaches a prescribed level, one of said control circuit and said signal forming circuit being coupled to and activated in response to the output of said detection circuit.

3. A flash unit according to claim 1, wherein said connection circuit includes connecting means to connect said external terminal selectively with said control signal forming circuits or with the light emission control circuit, and a connection control circuit responsive to the signal corresponding to said preset diaphragm aperture for connecting the light emission control circuit with the external terminal by said connection means.

4. A camera, usable with either a first flash unit which controls the diaphragm of a camera for flash photography by producing a diaphragm aperture control signal corresponding to a diaphragm aperture value suitable for flash photography during flash photography, and a second flash unit which controls the amount of light emitted based on a diaphragm aperture value preset in the camera, wherein said camera comprises:
   (a) a diaphragm aperture control circuit responsive to the diaphragm aperture control signal from the first flash unit for controlling a diaphragm aperture,
   (b) a diaphragm aperture information forming circuit responsive to the preset value for forming a diaphragm aperture information signal corresponding to the preset diapphragm aperture value,
   (c) a terminal and
   (d) connecting means coupled to the terminal and to the diaphragm aperture information circuit and said diaphragm aperture control circuit to selectively connect said terminal either with the diaphragm aperture control circuit or with the diaphragm aperture information forming circuit.

5. A flash camera system for flash light photographing, comprising:
   (A) camera including:
      (a) a diaphragm mechanism to form an aperture,
      (b) a diaphragm aperture control circuit coupled to said diaphragm mechanism and responsive to an input for controlling said diaphragm mechanism on the basis of an input signal to set the diaphragm aperture to correspond to the input signal,
      (c) diaphragm aperture presetting means coupled to said diaphragm mechanism for setting the diaphragm aperture independent of said diaphragm aperture control circuit, said presetting means having diaphragm aperture information signal forming means for forming a diaphragm aperture information signal corresponding to a preset diaphragm aperture value,
      (d) a camera terminal, and
      (e) a camera connection circuit coupled to the terminal and said diaphragm aperture control circuit as well as said diaphragm aperture information signal forming means which selectively connects said terminal either to said diaphragm aperture control circuit or to said diaphragm aperture information signal forming means, so that when the terminal and the diaphragm aperture control circuit are connected by the connection circuit, the diaphragm aperture is controlled based on the input signal inputted from the terminal, and when the terminal and the diaphragm aperture information signal forming means are connected the diaphragm aperture information signal can be carried by the terminal, and
   (B) a flash unit, including:
      (a) flash means for generating a flash, (b) diaphragm aperture control signal forming means to form a diaphragm aperture control signal corresponding to a prescribed diaphragm aperture value for flash photography, (c) a light emission control circuit coupled to said flash means to control the amount of light emitted by the flash means, (d) a flash terminal couplable to said camera terminal, and (e) a flash connection circuit coupled to the flash terminal and the diaphragm aperture control signal forming means as well as the light emission control circuit selectively connecting said flash terminal with either said diaphragm aperture control signal forming means or said light emission control circuit, so that when the camera terminal and the diaphragm aperture control circuit are connected by the camera connection circuit and the flash terminal and the diaphragm aperture control signal forming means are connected by the flash connection circuit of the flash device, the diaphragm aperture is controlled to operate on the basis of the diaphragm control signal from the flash light device, while when the camera terminal and the diaphragm aperture information signal forming means are connected and the flash terminal and the light emission control circuit are connected, the amount of light from the flash light is controlled on the basis of the preset diaphragm aperture value.

6. A flash camera system according to claim 5, wherein said flash connection circuit includes a detection circuit connected to the flash terminal of said flash light device for generating an output in response to said diaphragm aperture information signal, and connection means for connecting the flash terminal of the flash light device and the light emission control circuit on the basis of the output of said detection circuit so that when the diaphragm aperture information signal forming means is selected by the camera connection circuit, the flash terminal of the flash light device is automatically connected to the light emission control circuit and the mode is automatically changed to control the amount of light emitted the basis of the preset diaphragm aperture value.

* * * * *